(12) United States Patent
Su et al.

(10) Patent No.: US 10,122,020 B2
(45) Date of Patent: Nov. 6, 2018

(54) ALUMINUM SECONDARY BATTERY CATHODE HAVING ORIENTED GRAPHENE

(71) Applicant: Nanotek Instruments, Inc., Dayton, OH (US)

(72) Inventors: Yu-Sheng Su, Dayton, OH (US); Aruna Zhamu, Springboro, OH (US); Hui He, Dayton, OH (US); Baofei Pan, Dayton, OH (US); Bor Z. Jang, Centerville, OH (US)

(73) Assignee: Nanotek Instruments, Inc., Dayton, OH (US)

( * ) Notice: Subject to any disclaimer, the term of this patent is extended or adjusted under 35 U.S.C. 154(b) by 69 days.

(21) Appl. No.: 15/450,447

(22) Filed: Mar. 6, 2017

(65) Prior Publication Data
US 2018/0254485 A1   Sep. 6, 2018

(51) Int. Cl.
| | | |
|---|---|---|
| *H01M 4/00* | (2006.01) | |
| *H01M 4/587* | (2010.01) | |
| *H01M 10/054* | (2010.01) | |
| *H01M 4/38* | (2006.01) | |
| *H01M 4/62* | (2006.01) | |

(Continued)

(52) U.S. Cl.
CPC ......... *H01M 4/587* (2013.01); *C01B 31/0423* (2013.01); *H01M 4/043* (2013.01); *H01M 4/38* (2013.01); *H01M 4/622* (2013.01); *H01M 10/054* (2013.01); *C01P 2006/40* (2013.01); *H01M 2004/021* (2013.01); *H01M 2300/0045* (2013.01)

(58) Field of Classification Search
CPC ...... H01M 4/622; H01M 4/583; H01G 11/28; H01G 11/42
See application file for complete search history.

(56) References Cited

U.S. PATENT DOCUMENTS

| 2,798,878 A | 7/1957 | Hummers, Jr. |
| 2005/0271574 A1 | 12/2005 | Jang |

(Continued)

FOREIGN PATENT DOCUMENTS

WO    2012087698 A1    6/2012

OTHER PUBLICATIONS

Jayaprakash, N., Das, S. K. & Archer, L. A. "The rechargeable aluminum-ion battery," Chem. Commun. 47, 12610-12612 (2011).

(Continued)

*Primary Examiner* — Cynthia H Kelly
*Assistant Examiner* — Monique M Wills

(57) ABSTRACT

Provided is an aluminum secondary battery comprising an anode, a cathode, a porous separator electronically separating the anode and the cathode, and an electrolyte in ionic contact with the anode and the cathode to support reversible deposition and dissolution of aluminum at the anode, wherein the anode contains aluminum metal or an aluminum metal alloy as an anode active material and the cathode comprises a layer of aligned graphene sheets that are oriented in such a manner that the layer has a graphene edge plane in direct contact with the electrolyte and facing the separator. These aligned/oriented graphene sheets are preferably bonded by a binder for enhanced structural integrity and cycling stability. Such an aluminum battery delivers a high energy density, high power density, and long cycle life.

27 Claims, 11 Drawing Sheets

(51) Int. Cl.
  *H01M 4/04*   (2006.01)
  *C01B 31/04*  (2006.01)
  *H01M 4/02*   (2006.01)

(56) References Cited

U.S. PATENT DOCUMENTS

2015/0086881 A1    3/2015  Zhamu et al.
2015/0207148 A1*   7/2015  Kimura ................ H01M 4/622
                                                      429/199
2015/0249261 A1    9/2015  Dai et al.

OTHER PUBLICATIONS

Rani, J. V., Kanakaiah, V., Dadmal, T., Rao, M. S. & Bhavanarushi, S. "Fluorinated natural graphite cathode for rechargeable ionic liquid based aluminum-ion battery," J. Electrochem. Soc. 160, A1781-A1784 (2013).
Lin MC, Gong M, Lu B, Wu Y, Wang DY, Guan M, Chen C, Yang J, Hwang BJ, Dai H., "An ultrafast rechargeable aluminum-ion battery," Nature. Apr. 16, 2015;520 (7547):325-8.
PCT/US18/20419 International Search Report and Written Opinion dated Aug. 3, 2018, 10 pages.

* cited by examiner

ALUMINUM SECONDARY BATTERY CATHODE HAVING ORIENTED GRAPHENE

FIELD OF THE INVENTION

The present invention relates generally to the field of rechargeable aluminum battery and, more particularly, to a high-capacity and high-rate capable cathode layer containing oriented graphene sheets and a method of manufacturing this cathode layer and the aluminum battery.

BACKGROUND OF THE INVENTION

Historically, today's most favorite rechargeable energy storage devices—lithium-ion batteries—was actually evolved from rechargeable "lithium metal batteries" that use lithium (Li) metal as the anode and a Li intercalation compound (e.g. $MoS_2$) as the cathode. Li metal is an ideal anode material due to its light weight (the lightest metal), high electronegativity (−3.04 V vs. the standard hydrogen electrode), and high theoretical capacity (3,860 mAh/g). Based on these outstanding properties, lithium metal batteries were proposed 40 years ago as an ideal system for high energy-density applications.

Due to some safety concerns of pure lithium metal, graphite was later implemented as an anode active material in place of the lithium metal to produce the current lithium-ion batteries. The past two decades have witnessed a continuous improvement in Li-ion batteries in terms of energy density, rate capability, and safety. However, the use of graphite-based anodes in Li-ion batteries has several significant drawbacks: low specific capacity (theoretical capacity of 372 mAh/g as opposed to 3,860 mAh/g for Li metal), long Li intercalation time (e.g. low solid-state diffusion coefficients of Li in and out of graphite and inorganic oxide particles) requiring long recharge times (e.g. 7 hours for electric vehicle batteries), inability to deliver high pulse power, and necessity to use pre-lithiated cathodes (e.g. lithium cobalt oxide, as opposed to cobalt oxide), thereby limiting the choice of available cathode materials. Further, these commonly used cathode active materials have a relatively low lithium diffusion coefficient (typically $D \sim 10^{-16}$-$10^{-11}$ $cm^2$/sec). These factors have contributed to one major shortcoming of today's Li-ion batteries—a moderate energy density (typically 150-220 $Wh/kg_{cell}$) but extremely low power density (typically <0.5 kW/kg).

Supercapacitors are being considered for electric vehicle (EV), renewable energy storage, and modern grid applications. The supercapacitors typically operate on using porous electrodes having large surface areas for the formation of diffuse double layer charges. This electric double layer capacitance (EDLC) is created naturally at the solid-electrolyte interface when voltage is imposed. This implies that the specific capacitance of an EDLC-type supercapacitor is directly proportional to the specific surface area of the electrode material, e.g. activated carbon. This surface area must be accessible by the electrolyte and the resulting interfacial zones must be sufficiently large to accommodate the EDLC charges.

This EDLC mechanism is based on ion adsorption on surfaces of an electrode. The required ions are pre-existing in a liquid electrolyte and do not come from the opposite electrode. In other words, the required ions to be deposited on the surface of a negative electrode (anode) active material (e.g., activated carbon particles) do not come from the positive electrode (cathode) side, and the required ions to be deposited on the surface of a cathode active material do not come from the anode side. When a supercapacitor is recharged, local positive ions are deposited close to a surface of a negative electrode with their matting negative ions staying close side by side (typically via local molecular or ionic polarization of charges). At the other electrode, negative ions are deposited close to a surface of this positive electrode with the matting positive ions staying close side by side. Again, there is no exchange of ions between an anode active material and a cathode active material.

In some supercapacitors, the stored energy is further augmented by pseudo-capacitance effects due to some local electrochemical reactions (e.g., redox). In such a pseudo-capacitor, the ions involved in a redox pair also pre-exist in the same electrode. Again, there is no exchange of ions between the anode and the cathode.

Since the formation of EDLC does not involve a chemical reaction or an exchange of ions between the two opposite electrodes, the charge or discharge process of an EDLC supercapacitor can be very fast, typically in seconds, resulting in a very high power density (typically 2-8 kW/Kg). Compared with batteries, supercapacitors offer a higher power density, require no maintenance, offer a much higher cycle-life, require a very simple charging circuit, and are generally much safer. Physical, rather than chemical, energy storage is the key reason for their safe operation and extraordinarily high cycle-life.

Despite the positive attributes of supercapacitors, there are several technological barriers to widespread implementation of supercapacitors for various industrial applications. For instance, supercapacitors possess very low energy densities when compared to batteries (e.g., 5-8 Wh/kg for commercial supercapacitors vs. 20-40 Wh/Kg for the lead acid battery and 50-100 Wh/kg for the NiMH battery). Modern lithium-ion batteries possess a much higher energy density, typically in the range of 150-220 Wh/kg, based on the cell weight.

Secondary batteries based on various charge-discharge principles other than lithium ions have been proposed. Among them, some attention has been paid to aluminum secondary batteries based on the deposition-dissolution reaction of aluminum (Al) at the anode. Aluminum has a high ionization tendency and is capable of three-electron redox reactions, which can potentially enable an aluminum battery to deliver a high capacity and high energy density.

The abundance, low cost, and low flammability of Al, and its ability to undergo three-electron redox imply that rechargeable Al-based batteries could in principle offer cost-effectiveness, high capacity and safety. However, the rechargeable Al batteries developed over the past 30 years have failed to make it to the marketplace. This has been likely due to problems such as cathode material disintegration, low cell discharge voltage (e.g. 0.55V), a capacitive behavior without a discharge voltage plateau (e.g. 1.1-0.2 V), and short cycle life (typically <100 cycles) with rapid capacity decay (by 26-85% over 100 cycles), low cathode specific capacity, and low cell-level energy density (<50 Wh/kg).

For instance, Jayaprakash reports an aluminum secondary battery that shows a discharge curve having a plateau at 0.55 V [Jayaprakash, N., Das, S. K. & Archer, L. A. "The rechargeable aluminum-ion battery," Chem. Commun. 47, 12610-12612 (2011)]. A rechargeable battery having an output voltage lower than 1.0 volt has a limited scope of application. As a point of reference, alkaline battery has an output voltage of 1.5 volts and a lithium-ion battery has a typical cell voltage of 3.2-3.8 volts. Furthermore, even with an initial cathode specific capacity as high as 305 mAh/g, the energy storage capability of the cathode is approximately 0.55 V×305 mAh/g=167.75 Wh/kg based on the cathode active material weight alone (not based on the total cell weight). Thus, the cell-level specific energy (or gravimetric energy density) of this Al—$V_2O_5$ cell is approximately 167.75/3.6=46.6 Wh/kg (based on the total cell weight).

(As a point of reference, a lithium-ion battery having a lithium iron phosphate (LFP) as the cathode active material (having a theoretical specific capacity of 170 mAh/g) delivers an output voltage of 3.2 volts and an energy storage capability of 3.2 V×170 mAh/g=544 Wh/kg (based on the LFP weight only). This cell is known to deliver a cell-level energy density of approximately 150 Wh/kg. There is a reduction factor of 544/150=3.6 to convert a cathode active material weight-based energy density value to a total cell weight-based energy density value in this battery system.)

As another example, Rani reports an aluminum secondary battery using a lightly fluorinated natural graphite as the cathode active material having an output voltage varying from 0.2 volts to 1.1 volts [Rani, J. V., Kanakaiah, V., Dadmal, T., Rao, M. S. & Bhavanarushi, S. "Fluorinated natural graphite cathode for rechargeable ionic liquid based aluminum-ion battery," J. Electrochem. Soc. 160, A1781-A1784 (2013)]. With an average voltage of approximately 0.65 volts and a discharge capacity of 225 mAh/g, the cell delivers an energy storage capability of 0.65×225=146.25 Wh/kg (of the cathode active material weight only) or cell-level specific energy of 146.25/3.6=40.6 Wh/kg (based on the total cell weight).

As yet another example, Lin, et al. reports an aluminum-graphite foam cell that exhibits a plateau voltage near 2 volts and an output voltage of 70 mAh/g [Lin M C, Gong M, Lu B, Wu Y, Wang D Y, Guan M, Angell M, Chen C, Yang J, Hwang B J, Dai H., "An ultrafast rechargeable aluminum-ion battery," Nature. 2015 Apr. 16; 520 (7547):325-8]. The cell-level specific energy is expected to be approximately 70×2.0/3.6=38.9 Wh/kg. As a matter of fact, Lin, et al. has confirmed that the specific energy of their cell is approximately 40 Wh/kg.

Clearly, an urgent need exists for new cathode materials for an aluminum secondary battery that provide proper discharge voltage profiles (having a high average voltage and/or a high plateau voltage during discharge), high specific capacity at both high and low charge/discharge rates (not just at a low rate), and long cycle-life. Hopefully, the resulting aluminum battery can deliver some positive attributes of a supercapacitor (e.g. long cycle life and high power density) and some positive features of a lithium-ion battery (e.g. moderate energy density). These are the main objectives of the instant invention.

SUMMARY OF THE INVENTION

The invention provides a cathode or positive electrode layer for an aluminum secondary battery (rechargeable aluminum battery or aluminum-ion battery) and an aluminum secondary battery containing such a cathode layer.

In some preferred embodiments, the invented aluminum secondary battery comprises an anode, a cathode, a porous separator electronically separating the anode and the cathode, and an electrolyte in ionic contact with the anode and the cathode to support reversible deposition and dissolution of aluminum at the anode, wherein the anode contains aluminum metal or an aluminum metal alloy as an anode active material and the cathode comprises a layer of oriented (aligned) graphene sheets that are aligned and oriented in such a manner that the layer has a graphene edge plane in direct contact with the electrolyte (to readily admit ions from the electrolyte and release ions into electrolyte) and facing the separator (so that the ions permeating through the porous separator can readily enter the inter-graphene spaces near the edge plane).

In certain embodiments, the layer of compressed and oriented graphene sheets has a physical density from 0.5 to 1.8 $g/cm^3$ and has meso-scaled pores having a pore size from 2 nm to 50 nm. In some preferred embodiments, the layer of recompressed exfoliated graphite or carbon material has a physical density from 1.1 to 1.8 $g/cm^3$ and has pores having a pore size from 2 nm to 5 nm. In certain embodiments, the exfoliated graphite or carbon material has a specific surface area from 20 to 1,500 $m^2/g$. Preferably, the specific surface area is from 20 to 1,000 $m^2/g$, more preferably from 20 to 300 $m^2/g$.

Preferably, the oriented graphene sheets in the cathode layer are bonded together by a binder. Preferably, the binder is an electrically conducting polymer, such as polyaniline, polypyrrole, polythiophene, and other intrinsically conducting polymers (e.g. conjugate chain polymers). The conducting polymer binder amount may be from 0.1% to 15% by weight. Non-conducting resins can also be used as a binder, but the amount is preferably from 0.1% to 10% and more preferably less than 8% by weight. Preferably, the binder is chemically cured while the oriented graphene sheets are in a compression state so that the sizes of the inter-graphene spaces can be maintained during battery charge/discharge cycles.

Preferably, the electrolyte also supports reversible intercalation and de-intercalation of ions (cations, anions, or both) at the cathode. The aluminum alloy preferably contains at least 80% by weight Al element in the alloy (more preferably at least 90% by weight). There is no restriction on the type of alloying elements that can be chosen. Preferably, the alloying elements for Al are Si, B, Mg, Ti, Sc, etc.

This aluminum secondary battery can further comprise an anode current collector supporting the aluminum metal or aluminum metal alloy or further comprise a cathode current collector supporting the cathode active layer. The current collector can be a mat, paper, fabric, foil, or foam that is composed of conducting nano-filaments, such as graphene sheets, carbon nanotubes, carbon nano-fibers, carbon fibers, graphite nano-fibers, graphite fibers, carbonized polymer fibers, or a combination thereof, which form a 3D network of electron-conducting pathways. The high surface areas of such an anode current collector not only facilitate fast and uniform dissolution and deposition of aluminum ions, but also act to reduce the exchange current density and, thus, reduce the tendency to form metal dendrites that otherwise could cause internal shorting.

The oriented graphene sheets are preferably produced (by thermal exfoliation and mechanical shearing) from meso-phase pitch, meso-phase carbon, meso carbon micro-beads (MCMB), coke particles, expanded graphite flakes, artificial graphite particles, natural graphite particles, highly oriented pyrolytic graphite, soft carbon particles, hard carbon particles, multi-walled carbon nanotubes, carbon nano-fibers, carbon fibers, graphite nano-fibers, graphite fibers, carbonized polymer fibers, or a combination thereof, which are heavily intercalated, oxidized, fluorinated, etc.

The above-listed carbon/graphite material may be subjected to an inter-planar spacing expansion treatment, followed by a thermal exfoliation and recompression. The expansion treatment is conducted to increase the inter-planar spacing between two graphene planes in a graphite crystal, from a typical value of 0.335-0.36 nm to a typical value of 0.43-1.2 nm for the main purpose of weakening the van der Waals forces that hold neighboring graphene planes together. This would make it easier for subsequent thermal exfoliation. This expansion treatment includes an oxidation, fluorination, bromination, chlorination, nitrogenation, intercalation, combined oxidation-intercalation, combined fluorination-intercalation, combined bromination-intercalation, combined chlorination-intercalation, or combined nitrogenation-intercalation of the graphite or carbon material. The above procedure is followed by a thermal exfoliation without constraint. Unconstrained thermal exfoliation typically results in exfoliated graphite/carbon worms. The exfoliated graphite/carbon worms are then subjected to mechanical shearing (e.g. ultrasonication, air jet milling, ball-milling, wet milling, etc.) to produce isolated/separated graphene sheets. Multiple graphene sheets are then compressed to produce a layer or block of aligned (oriented) graphene sheets that are oriented in such a manner that the layer has a graphene edge plane in direct contact with the electrolyte and facing or contacting the separator. The layer of oriented graphene sheets typically has a physical density from 0.5 to 1.8 g/cm$^3$ (preferably from 1.0 to 1.8 g/cm$^3$) and has meso-scaled pores having a pore size from 2 nm to 50 nm, preferably from 2 nm to 20 nm.

Due to the expansion treatments, the oriented graphene sheets can contain a non-carbon element selected from oxygen, fluorine, chlorine, bromine, iodine, nitrogen, hydrogen, or boron. Thus, the graphene sheets can be selected from pristine graphene (essentially all-carbon), graphene oxide, reduced graphene oxide, graphene fluoride, graphene chloride, graphene bromide, graphene iodide, nitrogenated graphene, hydrogenated graphene, boron-doped graphene, or a combination thereof.

In the invented aluminum secondary battery, the electrolyte may be selected from an aqueous electrolyte, organic electrolyte, molten salt electrolyte, ionic liquid electrolyte, or a combination thereof. A polymer may be added to the electrolyte. Preferably, the electrolyte contains an aluminum salt such as, $AlF_3$, $AlCl_3$, $AlBr_3$, $AlI_3$, $AlF_xCl_{(3-x)}$, $AlBr_xCl_{(3-x)}$, $AlI_xCl_{(3-x)}$, or a combination thereof, wherein x is from 0.01 to 2.0. Mixed aluminum halides, such as $AlBr_xCl_{(3-x)}$, $AlI_xCl_{(3-x)}$, can be readily produced by brominating, fluorinating, or iodizing $AlCl_3$ to a desired extent; for instance at 100-350° C. for 1-24 hours.

Preferably, the electrolyte contains an ionic liquid that contains an aluminum salt mixed with an organic chloride selected from n-butyl-pyridinium-chloride (BuPyCl), 1-methyl-3-ethylimidazolium-chloride (MEICl), 2-dimethyl-3-propylimidazolium-chloride, 1,4-dimethyl-1,2,4-triazolium chloride (DMTC), or a mixture thereof.

In certain embodiments, the layer of oriented graphene operates as a cathode current collector to collect electrons during a discharge of the aluminum secondary battery and wherein the battery contains no separate or additional cathode current collector.

The cathode active layer of oriented graphene sheets may further comprise an electrically conductive binder material which bonds oriented graphene sheets together to form a cathode electrode layer. The electrically conductive binder material may be selected from coal tar pitch, petroleum pitch, meso-phase pitch, a conducting polymer, a polymeric carbon, or a derivative thereof.

Typically, the invented aluminum secondary battery has an average discharge voltage no less than 1 volt (typically and preferably >1.5 volts) and a cathode specific capacity greater than 200 mAh/g (preferably and more typically >300 mAh/g, and most preferably >400 mAh/g), based on a total cathode active layer weight.

Preferably, the aluminum secondary battery has an average discharge voltage no less than 2.0 volts and a cathode specific capacity greater than 100 mAh/g based on a total cathode active layer weight (preferably and more typically >300 mAh/g, and most preferably >400 mAh/g).

The present invention also provides a cathode active layer for an aluminum secondary battery. The cathode active layer comprises oriented graphene sheets having inter-graphene spaces or pores from 2 nm to 10 μm in size. Preferably, the oriented graphene sheets are a high-level thermal exfoliation product of meso-phase pitch, meso-phase carbon, meso carbon micro-beads (MCMB), coke particles, expanded graphite flakes, artificial graphite particles, natural graphite particles, highly oriented pyrolytic graphite, soft carbon particles, hard carbon particles, multi-walled carbon nanotubes, carbon nano-fibers, carbon fibers, graphite nano-fibers, graphite fibers, carbonized polymer fibers, or a combination thereof.

The carbon or graphite material has an original inter-planar spacing $d_{002}$ from 0.27 nm to 0.42 nm prior to an expansion treatment and the inter-planar spacing $d_{002}$ is increased to a range from 0.43 nm to 1.2 nm after the expansion treatment between essentially all the constituent graphene planes (hexagonal planes of carbon atoms). Preferably, the expanded carbon or graphite material (e.g. highly intercalated/oxidized) is subsequently thermally exfoliated to the extent that substantially all the constituent graphene planes are fully separated from one another. In other words, in these favorable situations (e.g. all stage-1 graphite intercalation compound or every graphene plane being highly oxidized), separate, isolated graphene sheets are formed during thermal exfoliation. In slightly less favorable conditions, the thermally exfoliated graphite is highly separated graphite worms that still contain interconnected graphite flakes. These loosely connected graphite flakes in the worms can then be readily and easily broken and separated into isolated graphene sheets or platelets. Multiple graphene sheets or platelets can then be recompressed to form a layer or block of highly oriented graphene sheets.

The present invention also provides a method of manufacturing an aluminum secondary battery. The method comprises: (a) providing an anode containing aluminum or an aluminum alloy; (b) providing a cathode comprising a layer of oriented graphene sheets; and (c) providing an electrolyte capable of supporting reversible deposition and dissolution of aluminum at the anode and reversible adsorption/desorption and/or intercalation/de-intercalation of ions at the cathode, wherein the layer of oriented graphene sheets is oriented in such a manner that the layer has a graphene edge plane in direct contact with the electrolyte and facing or contacting the separator. Typically, this graphene edge plane is substantially parallel to the porous separator and, thus, can readily accommodate ions that migrate through the separator into the spaces between graphene sheets. Preferably, the electrolyte contains an aqueous electrolyte, an organic electrolyte, a molten salt electrolyte, an ionic liquid, or a combination thereof.

The method can further include providing a porous network of electrically conductive nano-filaments to support the aluminum or aluminum alloy at the anode. The aluminum metal or aluminum alloy can be deposited onto the surfaces of these nano-filaments to form a thin coating. This can be accomplished by physical vapor deposition, sputtering, or electrochemical deposition.

In the method, the step of providing a cathode preferably contains subjecting a carbon or graphite material to an expansion treatment selected from an oxidation, fluorination, bromination, chlorination, nitrogenation, intercalation, combined oxidation-intercalation, combined fluorination-intercalation, combined bromination-intercalation, combined chlorination-intercalation, or combined nitrogenation-intercalation, followed by thermal exfoliation at a temperature from 100° C. to 2,500° C. and a procedure of mechanical shearing to produce isolated graphene sheets.

In certain preferred embodiments, the procedure of providing the cathode includes compressing graphene sheets using a wet compression or dry compression to align these graphene sheets along a desired direction. The procedure can produce a layer or block of oriented/aligned graphene sheets having a graphene edge plane being parallel to the separator, enabling direct entry of ions from separator pores into inter-graphene plane spaces with minimal resistance. Preferably, the procedure of providing the cathode includes compressing graphene sheets using a wet compression to align graphene sheets, wherein wet compression includes compressing or pressing a suspension of graphene sheets dispersed in a liquid electrolyte intended for use in an aluminum cell. Any of the aforementioned electrolytes can be utilized in this suspension. The electrolyte later becomes part of the electrolyte of the intended aluminum battery.

DESCRIPTION OF THE PREFERRED EMBODIMENTS

Figure 1A:
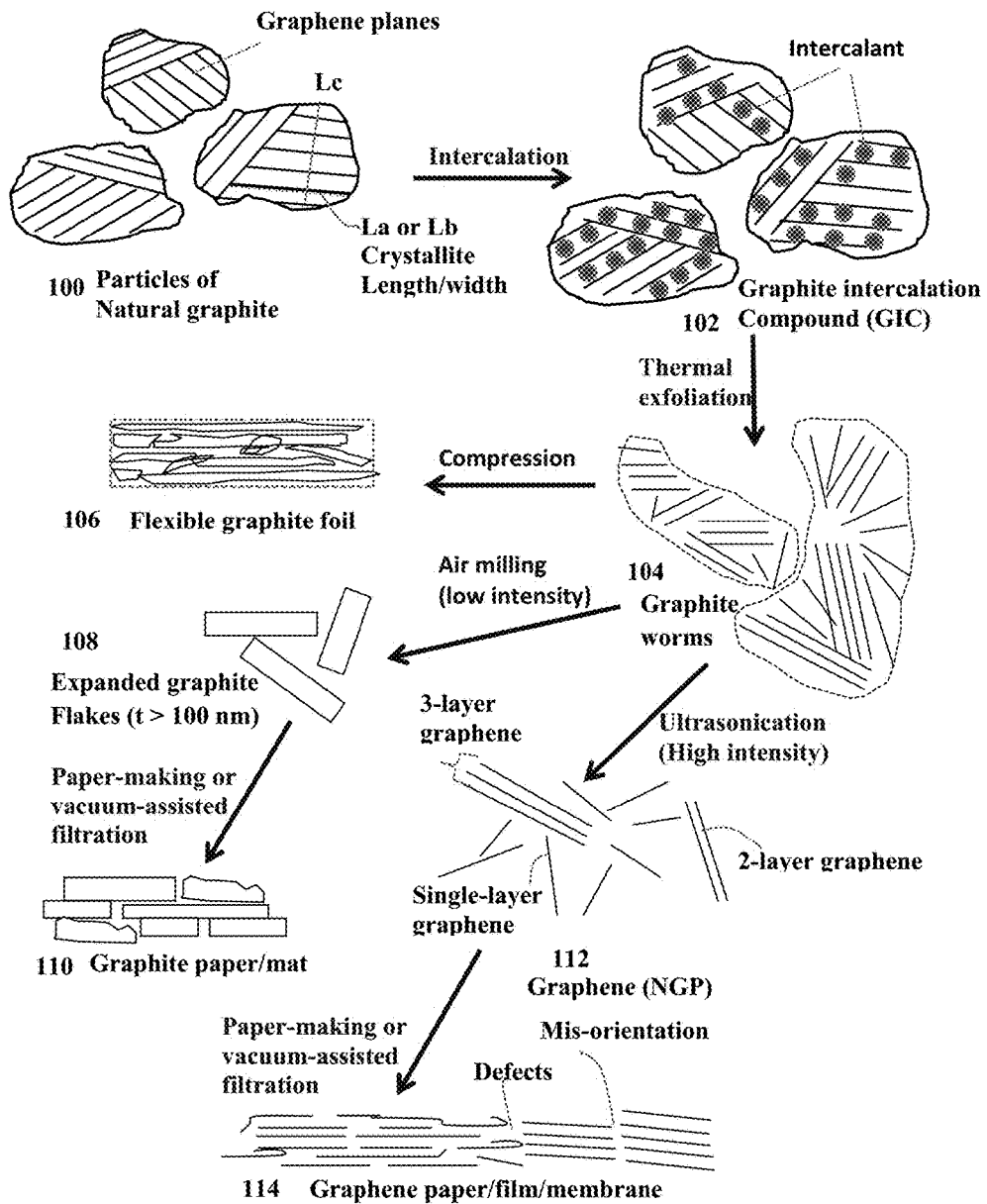
FIG. 1(A) Schematic drawing illustrating the processes for producing intercalated and/or oxidized graphite, subsequently exfoliated graphite worms, separated graphene sheets, and conventional paper, mat, film, and membrane of simply aggregated graphite flakes, graphene sheets, etc.

As schematically illustrated in the upper portion of FIG. 1(A), bulk natural graphite is a 3-D graphitic material with each graphite particle being composed of multiple grains (a grain being a graphite single crystal or crystallite) with grain boundaries (amorphous or defect zones) demarcating neighboring graphite single crystals. Each grain is composed of multiple graphene planes that are oriented parallel to one another. A graphene plane or hexagonal carbon atom plane in a graphite crystallite is composed of carbon atoms occupying a two-dimensional, hexagonal lattice. In a given grain or single crystal, the graphene planes are stacked and bonded via van der Waal forces in the crystallographic c-direction (perpendicular to the graphene plane or basal plane). The inter-graphene plane spacing in a natural graphite material is approximately 0.3354 nm.

Artificial graphite materials also contain constituent graphene planes, but they have an inter-graphene planar spacing, $d_{002}$, typically from 0.32 nm to 0.36 nm (more typically from 0.3339 to 0.3465 nm), as measured by X-ray diffraction. Many carbon or quasi-graphite materials also contain graphite crystals (also referred to as graphite crystallites, domains, or crystal grains) that are each composed of stacked graphene planes. These include meso-carbon mocro-beads (MCMBs), meso-phase carbon, soft carbon, hard carbon, coke (e.g. needle coke), carbon or graphite fibers (including vapor-grown carbon nano-fibers or graphite nano-fibers), and multi-walled carbon nanotubes (MW-CNT). The spacing between two graphene rings or walls in a MW-CNT is approximately 0.27 to 0.42 nm. The most common spacing values in MW-CNTs are in the range of 0.32-0.35 nm, which do not strongly depend on the synthesis method.

It may be noted that the "soft carbon" refers to a carbon material containing graphite domains wherein the orientation of the hexagonal carbon planes (or graphene planes) in one domain and the orientation in neighboring graphite domains are not too mis-matched from each other so that these domains can be readily merged together when heated to a temperature above 2,000° C. (more typically above 2,500° C.). Such a heat treatment is commonly referred to as graphitization. Thus, the soft carbon can be defined as a carbonaceous material that can be graphitized. In contrast, a "hard carbon" can be defined as a carbonaceous material that contain highly mis-oriented graphite domains that cannot be thermally merged together to obtain larger domains; i.e. the hard carbon cannot be graphitized. Both hard carbon and soft carbon contain graphite domains that can be intercalated, thermally exfoliated, and extracted/separated to form graphene sheets. The graphene sheets then can be recompressed to produce a cathode layer having graphene sheets being aligned.

The spacing between constituent graphene planes of a graphite crystallite in a natural graphite, artificial graphite, and other graphitic carbon materials in the above list can be expanded (i.e. the $d_{002}$ spacing being increased from the original range of 0.27-0.42 nm to the range of 0.42-2.0 nm) using several expansion treatment approaches, including oxidation, fluorination, chlorination, bromination, iodization, nitrogenation, intercalation, combined oxidation-intercalation, combined fluorination-intercalation, combined chlorination-intercalation, combined bromination-intercalation, combined iodization-intercalation, or combined nitrogenation-intercalation of the graphite or carbon material.

More specifically, due to the van der Waals forces holding the parallel graphene planes together being relatively weak, natural graphite can be treated so that the spacing between the graphene planes is increased to provide a marked expansion in the c-axis direction. This results in a graphite material having an expanded spacing, but the laminar character of the hexagonal carbon layers is substantially retained. The inter-planar spacing (also referred to as inter-graphene spacing) of graphite crystallites can be increased (expanded) via several approaches, including oxidation, fluorination, and/or inter-calation of graphite. The presence of an intercalant, oxygen-containing group, or fluorine-containing group serves to increase the spacing between two graphene planes in a graphite crystallite and weaken the van der Waals forces between graphene planes, enabling easier thermal exfoliation and separation of graphene sheets.

Figure 1B:
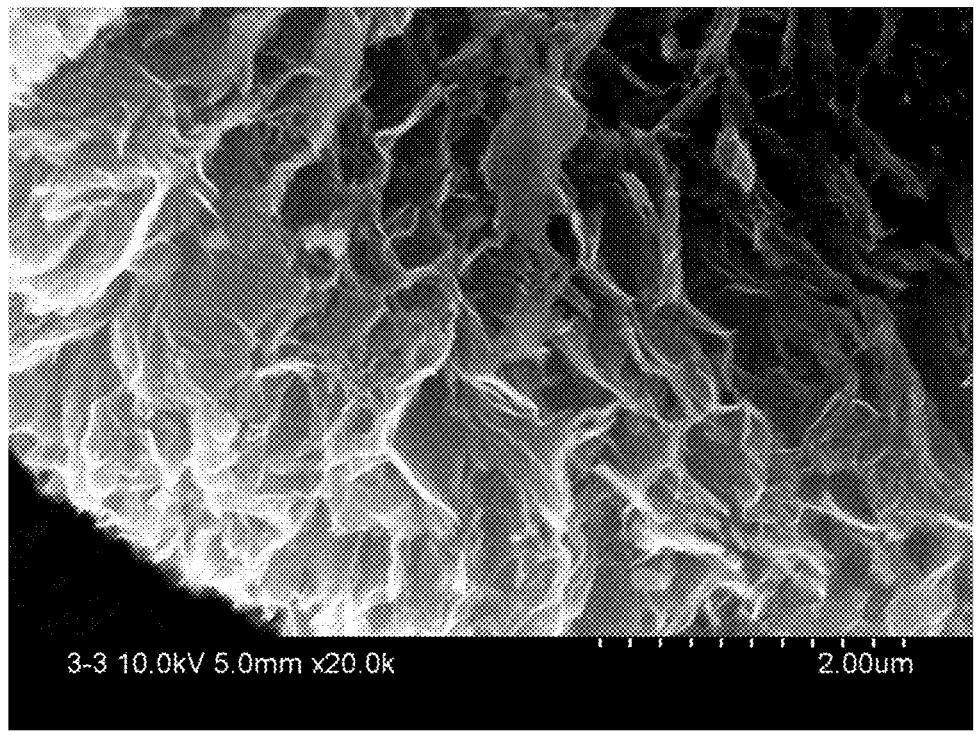
FIG. 1(B) An SEM image of exfoliated carbon (exfoliated carbon worms)
Figure 1C:
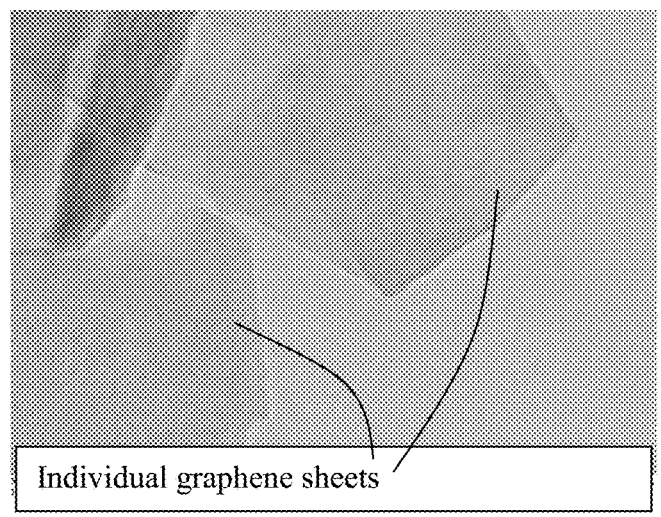
FIG. 1(C) A TEM image of graphene sheets.

The inter-planar spaces between certain graphene planes may be significantly increased (actually, exfoliated) if the graphite/carbon material having expanded d spacing is exposed to a thermal shock (e.g. by rapidly placing this carbon material in a furnace pre-set at a temperature of typically 800-2,500° C.) without constraint (i.e. being allowed to freely increase volume). Under these conditions, the thermally exfoliated graphite/carbon material appears like worms, wherein each graphite worm is composed of many graphite flakes remaining interconnected (please see FIG. 1(C)). However, these graphite flakes have inter-flake pores typically in the pore size range of 20 nm to 10 µm. The carbon/graphite worms may be subjected to mechanical shearing treatments to break up the worms and separate constituent graphene planes into graphene sheets.

In one process, graphite materials having an expanded inter-planar spacing are obtained by intercalating natural graphite particles with a strong acid and/or an oxidizing agent to obtain a graphite intercalation compound (GIC) or graphite oxide (GO), as illustrated in FIG. 1(A). The presence of chemical species or functional groups in the interstitial spaces between graphene planes serves to increase the inter-graphene spacing, $d_{002}$, as determined by X-ray diffraction, thereby significantly reducing the van der Waals forces that otherwise hold graphene planes together along the c-axis direction. The GIC or GO is most often produced by immersing natural graphite powder (100 in FIG. 1(A)) in a mixture of sulfuric acid, nitric acid (an oxidizing agent), and another oxidizing agent (e.g. potassium permanganate or sodium perchlorate). The resulting GIC (102) is actually some type of graphite oxide (GO) particles if an oxidizing agent is present during the intercalation procedure. This GIC or GO is then repeatedly washed and rinsed in water to remove excess acids, resulting in a graphite oxide suspension or dispersion, which contains discrete and visually discernible graphite oxide particles dispersed in water.

Water may be removed from the suspension to obtain "expandable graphite," which is essentially a mass of dried GIC or dried graphite oxide particles. The inter-graphene spacing, $d_{002}$, in the dried GIC or graphite oxide particles is typically in the range of 0.42-2.0 nm, more typically in the range of 0.5-1.2 nm. It may be noted than the "expandable graphite" is not "expanded graphite" (to be further explained later). Graphite oxide can have an oxygen content of 2%-50% by weight, more typically 20%-40% by weight.

There are two types of GO/GIC:

Type-1, heavily oxidized GO or Stage-1 GIC: The oxygen content is typically 30-47% by weight; the $d_{002}$ spacing is typically 0.9-1.2 nm; the X-ray diffraction peak corresponding to $d_{002}$=0.3345 nm disappears; Stage-1 GIC is defined as the graphite intercalation compound that contains one intercalant layer for every one graphene plane.

Type-2, moderately or lightly oxidized GO or Stage-n GIC (n>1): The oxygen content is typically 5-30% by weight; the $d_{002}$ spacing is typically 0.5-0.9 nm; the X-ray diffraction peak corresponding to $d_{002}$=0.3345 nm is weak but not disappeared; Stage-n GIC is defined as the graphite intercalation compound that contains one intercalant layer for every n graphene planes.

Figure 1D:
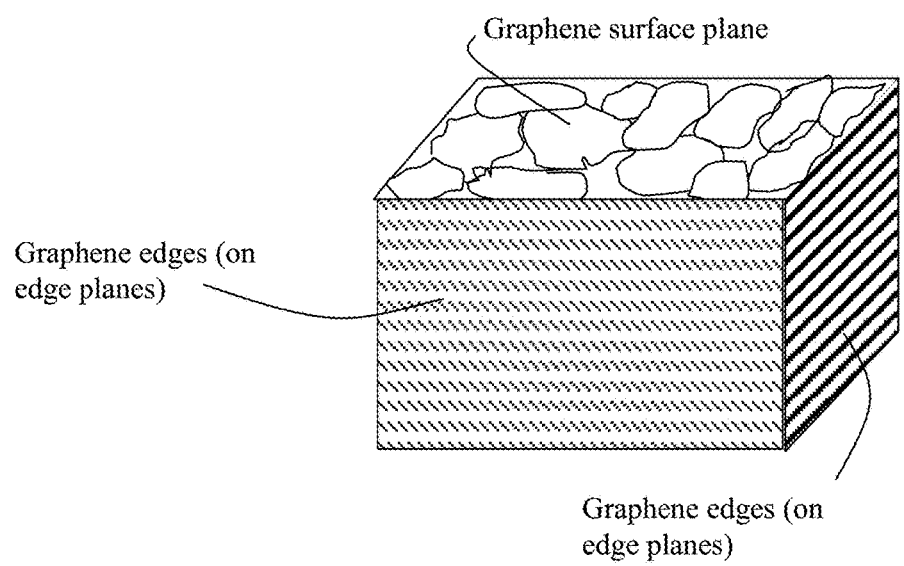
FIG. 1(D) Schematic drawing illustrating an approach of producing a layer of oriented graphene sheets.

Upon exposure of expandable graphite to a temperature in the range of typically 800-2,500° C. (more typically 900-1,050° C.) for approximately 30 seconds to 2 minutes, the CO or GIC undergoes a rapid volume expansion by a factor of 30-300 to form exfoliated and separated graphene sheets (if Type-1 GIC/GO) or "exfoliated graphite" or "graphite worms," 104 (if Type-2). Examples of graphene sheets are shown in FIG. 1(D). Graphite worms are each a collection of exfoliated, but largely un-separated graphite flakes that remain interconnected (FIG. 1(B)). In exfoliated graphite, individual graphite flakes (each containing 1 to several hundred graphene planes stacked together) are highly spaced from one another, having a spacing of typically 2.0 nm-10 µm. However, they remain physically interconnected, forming an accordion or worm-like structure.

Exfoliated graphite worms can be mechanically compressed to obtain "recompressed exfoliated graphite" for the purpose of densifying the mass of exfoliated graphite worms. In some engineering applications, the graphite worms are extremely heavily compressed to form flexible graphite sheets or foils 106 that typically have a thickness in the range of 0.1 mm-0.5 mm.)

Alternatively, in graphite industry, one may choose to use a low-intensity air mill or shearing machine to simply break up the graphite worms for the purpose of producing the so-called "expanded graphite" flakes (108) which contain mostly graphite flakes or platelets thicker than 100 nm (hence, not a nano material by definition). It is clear that the "expanded graphite" is not "expandable graphite" and is not "exfoliated graphite worm" either. Rather, the "expandable graphite" can be thermally exfoliated to obtain "graphite worms," which, in turn, can be subjected to mechanical shearing to break up the otherwise interconnected graphite flakes to obtain "expanded graphite" flakes. Expanded graphite flakes typically have the same or similar inter-planar spacing (typically 0.335-0.36 nm) of their original graphite. Expanded graphite is not graphene either. Expanded graphite flakes have a thickness typically greater than 100 nm; in contrast, graphene sheets typically have a thickness smaller than 100 nm, more typically less than 10 nm, and most typically less than 3 nm (single layer graphene is 0.34 nm thick).

Further alternatively, the exfoliated graphite or graphite worms may be subjected to high-intensity mechanical shearing (e.g. using an ultrasonicator, high-shear mixer, high-intensity air jet mill, or high-energy ball mill) to form separated single-layer and multi-layer graphene sheets (collectively called nano graphene platelets, NGPs, 112), as disclosed in our U.S. application Ser. No. 10/858,814. Single-layer graphene can be as thin as 0.34 nm, while multi-layer graphene can have a thickness up to 100 nm, but more typically less than 3 nm (commonly referred to as few-layer graphene). Multiple graphene sheets or platelets may be made into a sheet of NGP paper (114) using a paper-making process.

Graphene can be pristine graphene, graphene oxide, reduced graphene oxide, graphene fluoride, graphene chloride, graphene iodide, hydrogenated graphene, nitrogenated graphene, doped graphene (e.g. B-doped graphene), functionalized graphene, etc. The production of these graphene materials are now well-known in the art.

In the instant invention, as illustrated in the lower right portion of FIG. 1(D), graphene sheets are compressed to the extent that they are more or less parallel to one another and the edges of these graphene sheets define an edge plane of the resulting block or layer of oriented graphene sheets. Primary surfaces of some of the graphene sheets (top or bottom surfaces) can constitute a graphene surface plane (as opposed to the edge plane).

It may be noted that the "expandable graphite" or graphite with expanded inter-planar spacing may also be obtained by forming graphite fluoride (GF), instead of GO. Interaction of $F_2$ with graphite in a fluorine gas at high temperature leads to covalent graphite fluorides, from $(CF)_n$ to $(C_2F)_n$, while at low temperatures graphite intercalation compounds (GIC) $C_xF$ ($2 \leq x \leq 24$) form. In $(CF)_n$ carbon atoms are sp3-hybridized and thus the fluorocarbon layers are corrugated consisting of trans-linked cyclohexane chairs. In $(C_2F)_n$ only half of the C atoms are fluorinated and every pair of the adjacent carbon sheets are linked together by covalent C—C bonds. Systematic studies on the fluorination reaction showed that the resulting F/C ratio is largely dependent on the fluorination temperature, the partial pressure of the fluorine in the fluorinating gas, and physical characteristics of the graphite precursor, including the degree of graphitization, particle size, and specific surface area. In addition to fluorine ($F_2$), other fluorinating agents (e.g. mixtures of $F_2$ with $Br_2$, $Cl_2$, or $I_2$) may be used, although most of the available literature involves fluorination with $F_2$ gas, sometimes in presence of fluorides.

We have observed that lightly fluorinated graphite, $C_xF$ ($2 \leq x \leq 24$), obtained from electrochemical fluorination, typically has an inter-graphene spacing ($d_{002}$) less than 0.37 nm, more typically <0.35 nm. Only when x in $C_xF$ is less than 2 (i.e. $0.5 \leq x < 2$) can one observe a $d_{002}$ spacing greater than 0.5 nm (in fluorinated graphite produced by a gaseous phase fluorination or chemical fluorination procedure). When x in $C_xF$ is less than 1.33 (i.e. $0.5 \leq x < 1.33$) one can observe a $d_{002}$ spacing greater than 0.6 nm. This heavily fluorinated graphite is obtained by fluorination at a high temperature (>>200° C.) for a sufficiently long time, preferably under a pressure >1 atm, and more preferably >3 atm. For reasons remaining unclear, electrochemical fluorination of graphite leads to a product having a d spacing less than 0.4 nm even though the product $C_xF$ has an x value from 1 to 2. It is possible that F atoms electrochemically introduced into graphite tend to reside in defects, such as grain boundaries, instead of between graphene planes and, consequently, do not act to expand the inter-graphene planar spacing.

Upon exposure to heat shock, highly fluorinated graphite can directly lead to the formation of graphene fluoride sheets, one type of graphene material. Lightly or moderately fluorinated graphite, upon exposure to heat shock, result in the formation of fluorinated graphite worms, which can be subjected to mechanical shearing to produce graphene fluoride sheets.

The nitrogenation of graphene can be conducted by exposing a graphene oxide material to ammonia at high temperatures (200-400° C.). Nitrogenation may also be conducted at lower temperatures by a hydrothermal method; e.g. by sealing GO and ammonia in an autoclave and then increased the temperature to 150-250° C.

Figure 1E:
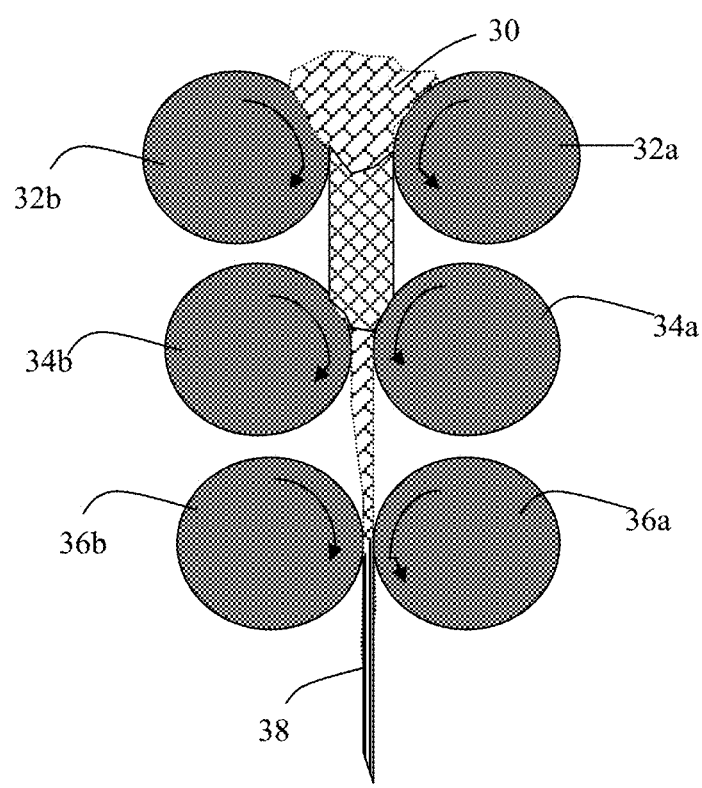
FIG. 1(E) A continuous process for producing a structure of aligned graphene sheets, including feeding dry powder of graphene sheets into the gap between a pair of two counter-rotating rollers or the gaps between several pairs of rollers.

Compression or re-compression of graphene sheets into a layer or block of recompressed graphene sheets having a preferred orientation can be accomplished by using several procedures, which can be classified into two broad categories: dry pressing/rolling or wet pressing/rolling. The dry process entails mechanically pressing graphene sheets in one direction (uniaxial compression) without the presence of a liquid medium. Alternatively, as schematically illustrated in FIG. 1(E), the process includes feeding dry powder of graphene sheets 30 into the gap between two counter-rotating rollers (e.g. 32a and 32b) to form a slightly compressed layer of "re-compressed graphene sheets," which are then further compressed to form a thinner layer of further re-compressed graphene sheets (containing aligned graphene sheets) by directing the material into the gap between another two rollers (e.g. 34a and 34b). If necessary, another pair or multiple pairs of rollers (e.g. 36a and 36b) can be implemented to further reduce the layer thickness and further improve the degree of graphene orientation, resulting in a layer 38 of relatively well-aligned graphene sheets.

A layer of oriented graphene structure (or multiple layers of such a structure stacked and/or bonded together) may be cut and slit to produce a desired number of pieces of the oriented graphene structure. Assuming that each piece is a cube or tetragon, each cube will then have 4 graphene sheet edge planes and 2 graphene surface planes as illustrated in the bottom right portion of FIG. 1(D). When such a piece is implemented as a cathode layer, the layer can be positioned and aligned in such a manner that one of the graphene edge planes is substantially parallel to the anode layer or the porous separator layer. This graphene edge plane typically is very close to or actually in direct contact with the separator layer. Such an orientation is found to be conducive to entry and exiting of ions into/from the interstitial spaces between graphene planes in the electrode, leading to significantly improved high-rate capability and high power density.

It may be noted that the same procedures can be used to produce a wet layer of graphene sheets provided the starting graphene sheets are dispersed in a liquid medium. This liquid medium may be simply water or solvent, which must be removed upon completion of the roll-pressing procedure. The liquid medium may be or may contain a resin binder that helps to bond graphene sheets together, although a resin binder is not required or desired. Alternatively and desirably, some amount of the liquid electrolyte (intended to become part of the electrolyte of the final aluminum cell) may be mixed with the graphene sheets prior to being compressed or roll-pressed. This liquid electrolyte is allowed to stay between graphene sheets during the subsequent battery cell fabrication process.

Thus, the present invention also provides a wet process for producing an electrolyte-impregnated, oriented graphene sheets for use as an aluminum battery cathode layer. In a preferred embodiment, the wet process (method) comprises: (a) preparing a dispersion or slurry having graphene sheets dispersed in a liquid or gel electrolyte; and (b) subjecting the suspension to a forced assembly procedure, forcing the graphene sheets to assemble into the electrolyte-impregnated graphene sheet structure, wherein electrolyte resides in the inter-graphene spaces in the structure of oriented graphene sheets. The graphene sheets are substantially aligned along a desired direction. The recompressed graphene sheet structure has a physical density from 0.5 to 1.7 g/cm$^3$ (more typically 0.7-1.3 g/cm$^3$) and a specific surface area from 20 to 1,500 m$^2$/g, when measured in a dried state without the electrolyte.

In some desired embodiments, the forced assembly procedure includes introducing an graphene sheet suspension, having an initial volume $V_1$, in a mold cavity cell and driving a piston into the mold cavity cell to reduce the suspension volume to a smaller value $V_2$, allowing excess electrolyte to flow out of the cavity cell (e.g. through holes of the mold cavity cell or of the piston) and aligning the multiple graphene sheets along a direction at an angle from approximately 45° to 90° relative to the movement direction of the piston. It may be noted that the electrolyte used in this suspension becomes portion of the electrolyte for the intended aluminum cell.

Figure 1F:
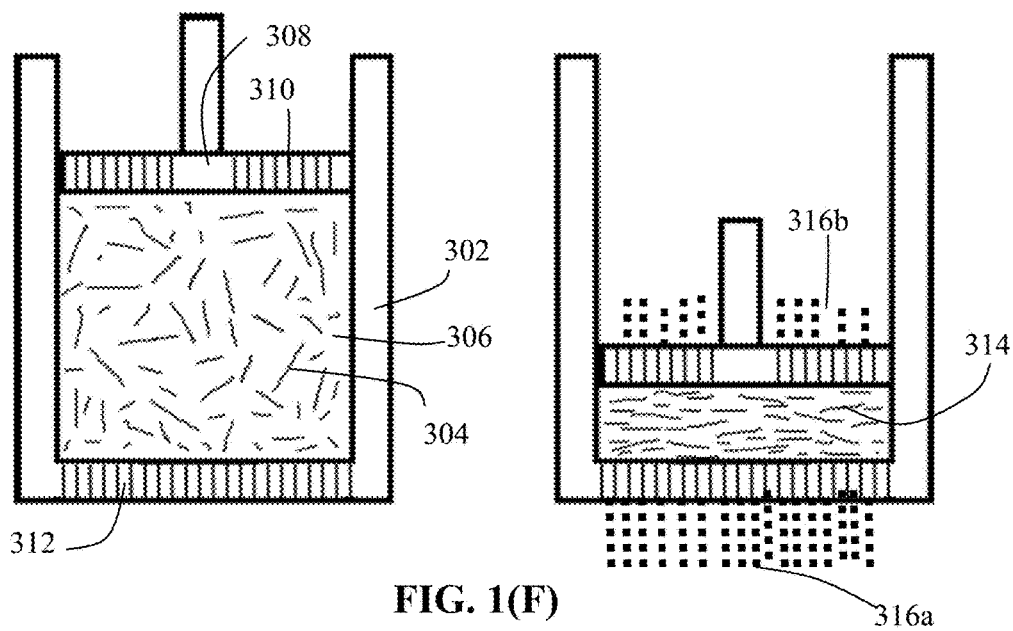
FIG. 1(F) A schematic drawing to illustrate an example of a compressing and consolidating operation (using a mold cavity cell 302 equipped with a piston or ram 308) for forming a layer of highly compacted and oriented graphene sheets.

FIG. 1(F) provides a schematic drawing to illustrate an example of a compressing and consolidating operation (using a mold cavity cell 302 equipped with a piston or ram 308) for forming a layer of highly compacted and oriented graphene sheets 314. Contained in the chamber (mold cavity cell 302) is a suspension (or slurry) that is composed of graphene sheets 304 randomly dispersed in a liquid or gel electrolyte 306. As the piston 308 is driven downward, the volume of the suspension is decreased by forcing excess liquid electrolyte to flow through minute channels 312 on a mold wall or through small channels 310 of the piston. These small channels can be present in any or all walls of the mold cavity and the channel sizes can be designed to permit permeation of the electrolyte species, but not the solid graphene sheets. The excess electrolyte is shown as 316a and 316b on the right diagram of FIG. 1(E). As a result of this compressing and consolidating operation, graphene sheets 314 are aligned parallel to the bottom plane or perpendicular to the layer thickness direction.

Figure 1G:
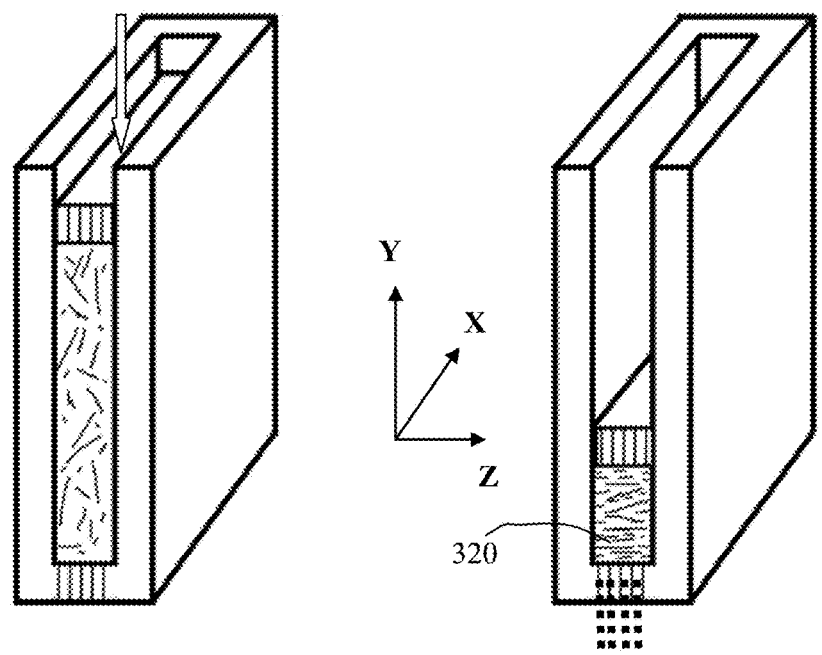
FIG. 1(G) Schematic drawing to illustrate another example of a compressing and consolidating operation (using a mold cavity cell equipped with a piston or ram) for forming a layer of highly compacted and oriented graphene sheets.

Shown in FIG. 1(G) is a schematic drawing to illustrate another example of a compressing and consolidating operation (using a mold cavity cell equipped with a piston or ram) for forming a layer of highly compacted and oriented graphene sheets 320. The piston is driven downward along the Y-direction. The graphene sheets are aligned on the X-Z plane and perpendicular to X-Y plane (along the Z- or thickness direction). This layer of oriented graphene sheets can be attached to a current collector (e.g. graphene mat) that is basically represented by the X-Y plane. In the resulting electrode, graphene sheets are aligned perpendicular to the current collector. Such an orientation is conducive to a faster ion intercalation into and out of the spaces between graphene sheets and, hence, leads to a higher power density as compared to the corresponding electrode featuring graphene sheets being aligned parallel to the current collector plane (graphene surface plane, not edge plane, being parallel to the separator plane).

The configuration of an aluminum secondary battery is now discussed as follows:

An aluminum secondary battery includes a positive electrode (cathode), a negative electrode (anode), and an electrolyte including an aluminum salt and a solvent. The anode can be a thin foil or film of aluminum metal or aluminum metal alloy (e.g. left-hand side of FIG. 2(A)). The anode can be composed of particles, fibers, wires, tubes, or discs of Al metal or Al metal alloy that are packed and bonded together by a binder (preferably a conductive binder) to form an anode layer.

Figure 2A:
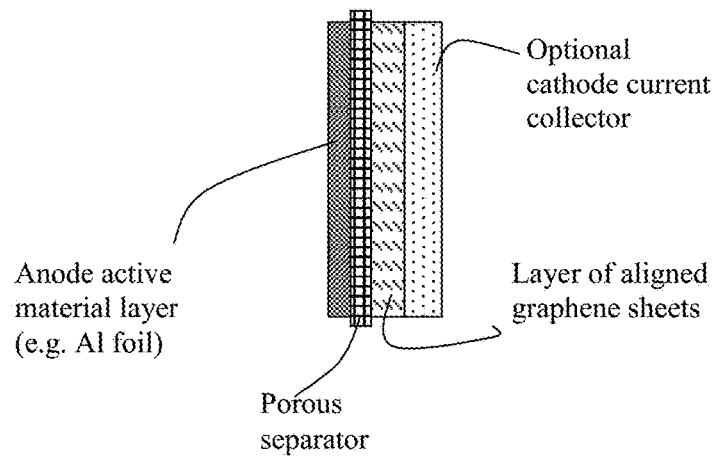
FIG. 2(A) Schematic of an aluminum secondary battery, wherein the anode layer is a thin Al coating or Al foil and the cathode active material layer contains a layer of graphene sheets.
Figure 2B:
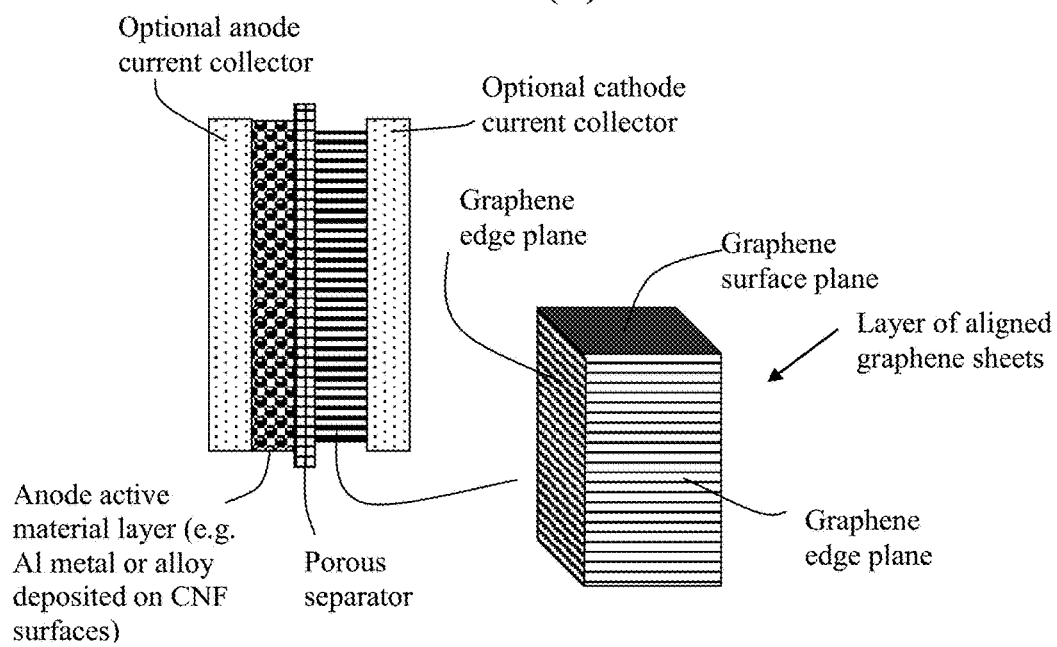
FIG. 2(B) schematic of an aluminum secondary battery cell having a cathode active material layer composed of graphene sheets and an anode composed of Al metal coating deposited on surfaces of a nano-structured network of conductive filaments.

A desirable anode layer structure is composed of a network of electron-conducting pathways (e.g. mat of graphene sheets, carbon nano-fibers, or carbon-nanotubes) and a thin layer of aluminum metal or alloy coating deposited on surfaces of this conductive network structure (e.g. left-hand side of FIG. 2(B)). Such an integrated nano-structure may be composed of electrically conductive nanometer-scaled filaments that are interconnected to form a porous network of electron-conducting paths comprising interconnected pores, wherein the filaments have a transverse dimension less than 500 nm. Such filaments may comprise an electrically conductive material selected from the group consisting of electro-spun nano fibers, vapor-grown carbon or graphite nano fibers, carbon or graphite whiskers, carbon nano-tubes, nano-scaled graphene platelets, metal nano wires, and combinations thereof. Such a nano-structured, porous supporting material for aluminum can significantly improve the aluminum deposition-dissolution kinetics, enabling high-rate capability of the resulting aluminum secondary cell.

Illustrated in FIG. 2(A) is a schematic of an aluminum secondary battery, wherein the anode layer is a thin Al coating or Al foil and the cathode active material layer contains a layer of graphene sheets that have been recompressed and aligned. Alternatively, FIG. 2(B) shows a schematic of an aluminum secondary battery cell wherein the anode layer is composed of a thin coating of aluminum metal or aluminum alloy supported on surfaces of a network of conductive filaments and the cathode active material layer contains a layer of graphene sheets that have been recompressed and aligned. The layer or block of oriented graphene sheets has a graphene edge plane facing the separator and substantially parallel to the separator layer (graphene sheets being perpendicular to the separator plane).

The composition of the electrolyte, which functions as an ion-transporting medium for charge-discharge reaction, has a great effect on battery performance. To put aluminum secondary batteries to practical use, it is necessary to allow aluminum deposition-dissolution reaction to proceed smoothly and sufficiently even at relatively low temperature (e.g., room temperature). In conventional aluminum secondary batteries, however, aluminum deposition-dissolution reaction can proceed smoothly and sufficiently only at relatively high temperature (e.g., 50° C. or higher), and the efficiency of the reaction is also low. The electrolyte for use in an aluminum secondary battery can include an aluminum salt, alkyl sulfone, and a solvent with a dielectric constant of 20 or less so that the electrolyte can operate at a lower temperature (e.g. room temperature) at which aluminum deposition-dissolution reaction proceeds.

Aqueous electrolytes that can be used in the aluminum secondary batteries include aluminum salts dissolved in water; for instance, $AlCl_3\cdot 6H_2O$, $CrCl_3\cdot 6H_2O$, and $Al(NO_3)_3$ in water. Alkaline solutions, such as KOH and NaOH in water, may also be used.

Organic electrolytes for use in aluminum secondary batteries include various electrolytes with g-butyrolactone (BLA) or acetonitrile (ACN) as solvent; e.g. $AlCl_3$/KCl salts in BLA or $(C_2H_5)_4NClxH_2O$ (TEAC) in ACN. Also included are concentrated aluminum triflate-based electrolyte, a bath of aluminum chloride and lithium aluminum hydride dissolved in diethyl ether, and $LiAlH_4$ and $AlCl_3$ in tetrahydrofuran. For example, alkyl sulfone such as dimethylsulfone may be used, along with an organic solvent such as a cyclic or chain carbonate or a cyclic or chain ether can be used. In order to reduce polarization during discharge, an aluminum salt such as aluminum chloride and an organic halide such as trimethylphenylammonium chloride may be used together in the electrolyte. For this salt mixture, an organic solvent such as 1,2-dichloroethane may be used.

Another type of electrolyte capable of reversible aluminum electrochemistry is molten salt eutectics. These are typically composed of aluminum chloride, sodium chloride, potassium chloride and lithium chloride in some molar ratio. Useful molten salt electrolytes include $AlCl_3$—NaCl, $AlCl_3$—(LiCl—KCl), and $AlCl_3$—KCl—NaCl mixtures. Among these alkali chloroaluminate melts, binary NaCl—$AlCl_3$ and ternary NaCl—KCl—$AlCl_3$ systems are the most widely used molten salts for developing aluminum batteries. In these systems the melts with molar ratio of $MCl/AlCl_3$ (where M is commonly Na and/or K) larger than unity are defined as basic, whereas those with molar ratio less than unity as acidic. In an acidic melt, $Al_2Cl_7^-$ is the major anion species. As the acidity ($AlCl_3$ content) of the melt decreases, $AlCl_4^-$ becomes the major species.

A special class of molten salt for use in an aluminum secondary battery is room temperature molten salts (ionic liquids). For instance, a useful ionic liquid electrolyte solution is aluminum chloride mixed in 1-ethyl-3-methylimidazolium chloride ($AlCl_3$:EMIC). Commercially available 1-ethyl-3-methylimidazolium chloride may be purified by recrystallization from ethyl acetate and acetonitrile. Aluminum chloride may be further purified by triple sublimation. The ionic liquid may be prepared by slowly mixing molar equivalent amounts of both salts. Further, $AlCl_3$ was then added to the equimolar mix until a concentration of 1M $AlCl_3$ was obtained. Desirably, this concentration corresponds to a molar ratio of 1.2:1, $AlCl_3$:EMIC.

Aluminum chloride ($AlCl_3$) also forms room temperature electrolytes with organic chlorides, such as n-butyl-pyridinium-chloride (BuPyCl), 1-methyl-3-ethylimidazolium-chloride (MEICl), and 2-dimethyl-3-propylimidazolium-chloride. The molten mixture of 1,4-dimethyl-1,2,4-triazolium chloride (DMTC) and $AlCl_3$ may also be used as the secondary battery electrolyte.

This invention is directed at the cathode active layer (positive electrode layer) containing a high-capacity cathode material for the aluminum secondary battery. The invention also provides such a battery based on an aqueous electrolyte, a non-aqueous electrolyte, a molten salt electrolyte, a polymer gel electrolyte (e.g. containing an aluminum salt, a liquid, and a polymer dissolved in the liquid), an ionic liquid electrolyte, or a combination thereof. The shape of an aluminum secondary battery can be cylindrical, square, button-like, etc. The present invention is not limited to any battery shape or configuration.

The following examples are used to illustrate some specific details about the best modes of practicing the instant invention and should not be construed as limiting the scope of the invention.

Example 1: Oxidation of Graphite and Thermal Exfoliation of Oxidized Graphite

Natural flake graphite, nominally sized at 45 μm, provided by Asbury Carbons (405 Old Main St., Asbury, N.J. 08802, USA) was milled to reduce the size to approximately 14 μm (Sample 1a). The chemicals used in the present study, including fuming nitric acid (>90%), sulfuric acid (95-98%), potassium chlorate (98%), and hydrochloric acid (37%), were purchased from Sigma-Aldrich and used as received. Graphite oxide (GO) samples were prepared according to the following procedure:

Sample 1A: A reaction flask containing a magnetic stir bar was charged with sulfuric acid (176 mL) and nitric acid (90 mL) and cooled by immersion in an ice bath. The acid mixture was stirred and allowed to cool for 15 min, and graphite (10 g) was added under vigorous stirring to avoid agglomeration. After the graphite powder was well dispersed, potassium chlorate (110 g) was added slowly over 15 min to avoid sudden increases in temperature. The reaction flask was loosely capped to allow evolution of gas from the reaction mixture, which was stirred for 24 hours at room temperature. On completion of the reaction, the mixture was poured into 8 L of deionized water and filtered. The GO was re-dispersed and washed in a 5% solution of HCl to remove sulphate ions. The filtrate was tested intermittently with barium chloride to determine if sulphate ions are present. The HCl washing step was repeated until this test was negative. The GO was then washed repeatedly with deionized water until the pH of the filtrate was neutral. The GO slurry was spray-dried and stored in a vacuum oven at 60° C. until use.

Sample 1B: The same procedure as in Sample 1A was followed, but the reaction time was 48 hours.

Sample 1C: The same procedure as in Sample 1A was followed, but the reaction time was 96 hours.

X-ray diffraction studies showed that after a treatment of 24 hours, a significant proportion of graphite has been transformed into graphite oxide. The peak at $2\theta=26.3$ degrees, corresponding to an inter-planar spacing of 0.335 nm (3.35 Å) for pristine natural graphite was significantly reduced in intensity after a deep oxidation treatment for 24 hours and a peak typically near $2\theta=9$-14 degrees (depending upon degree of oxidation) appeared. In the present study, the curves for treatment times of 48 and 96 hours are essentially identical, showing that essentially all of the graphite crystals have been converted into graphite oxide with an inter-planar spacing of 6.5-7.5 Å (the 26.3 degree peak has totally disappeared and a peak of approximately at $2\theta=11.75$-13.7 degrees appeared).

Samples 1A, 1B, and 1C were then subjected to unconstrained thermal exfoliation (1,050° C. for 2 minutes), followed by airjet milling, to obtain graphene sheets. The graphene sheets were compressed into layers of oriented graphene sheets having physical density ranging from approximately 0.5 to 1.75 g/cm³, using both dry compression and wet compression procedures.

Example 2: Oxidation, Intercalation and Thermal Exfoliation of Various Graphitic Carbon and Graphite Materials Samples 2A, 2B, 2C, and 2D were prepared according to the same procedure used for Sample 1B, but the starting graphite materials were pieces of highly oriented pyrolytic graphite (HOPG), graphite fiber, graphitic carbon nano-fiber, and spheroidal graphite, respectively. After the expansion treatment, their final inter-planar spacings are 6.6 Å, 7.3 Å, 7.3 Å, and 6.6 Å, respectively. They were subsequently thermally exfoliated, mechanically sheared (ultrasonicated) to separate/isolate graphene sheets, and recompressed to obtain oriented graphene structures of various controlled densities, specific surface areas, and degrees of orientation.

Example 3: Preparation of Graphite Oxide (GO) Using a Modified Hummers' Method and Subsequent Thermal Exfoliation Graphite oxide (Sample 3A) was prepared by oxidation of natural graphite flakes with sulfuric acid, sodium nitrate, and potassium permanganate according to the method of Hummers [U.S. Pat. No. 2,798,878, Jul. 9, 1957]. In this example, for every 1 gram of graphite, we used a mixture of 22 ml of concentrated sulfuric acid, 2.8 grams of potassium permanganate, and 0.5 grams of sodium nitrate. The graphite flakes were immersed in the mixture solution and the reaction time was approximately one hour at 35° C. It is important to caution that potassium permanganate should be gradually added to sulfuric acid in a well-controlled manner to avoid overheat and other safety issues. Upon completion of the reaction, the mixture was poured into deionized water and filtered. The sample was then washed repeatedly with deionized water until the pH of the filtrate was approximately 5. The slurry was spray-dried and stored in a vacuum oven at 60° C. for 24 hours. The interlayer spacing of the resulting laminar graphite oxide was determined by the Debye-Scherrer X-ray technique to be approximately 0.73 nm (7.3 Å). Some of the powder was subsequently exfoliated in a furnace, pre-set at 950-1,100° C., for 2 minutes to obtain graphene sheets. The graphene sheets were re-compressed using both the wet and dry press-rolling procedures to obtain layers of oriented graphene sheets.

Example 4: Oxidation and Thermal Exfoliation of Meso-Carbon Micro-Beads (MCMBs)

Oxidized carbon beads (Sample 4A) were prepared by oxidation of meso-carbon micro-beads (MCMBs) according to the same procedure used in Example 3. MCMB micro-beads (Sample 4a) were supplied by China Steel Chemical Co. This material has a density of about 2.24 g/cm³; an average particle of 16 microns and an inter-planar distance of about 0.336 nm. After deep oxidation/intercalation treatment, the inter-planar spacing in the resulting graphite oxide micro-beads is approximately 0.76 nm. The treated MCMBs were then thermally exfoliated at 900° C. for 2 minutes to obtain exfoliated carbon, which also showed a worm-like appearance (herein referred to as "exfoliated carbon", "carbon worms," or "exfoliated carbon worms"). The carbon worms were then airjet-milled to form graphene sheets and roll-pressed to different extents to obtain recompressed graphene sheets having different densities, specific surface areas, and degrees of orientation.

Example 5: Bromination and Fluorination of Carbon Fibers and Thermal Exfoliation Graphitized carbon fiber (Sample 5a), having an inter-planar spacing of 3.37 Å (0.337 nm) and a fiber diameter of 10 μm was first halogenated with a combination of bromine and iodine at temperatures ranging from 75° C. to 115° C. to form a bromine-iodine intercalation compound of graphite as an intermediate product. The intermediate product was then reacted with fluorine gas at temperatures ranging from 275° C. to 450° C. to form the $CF_y$. The value of y in the $CF_y$ samples was approximately 0.6-0.9. X-ray diffraction curves typically show the co-existence of two peaks corresponding to 0.59 nm and 0.88 nm, respectively. Sample 5A exhibits substantially 0.59 nm peak only and Sample 5B exhibits substantially 0.88 nm peak only. Some of powders were thermally exfoliated, mechanically sheared to separate/isolate graphene sheets, and then re-compressed to obtain oriented, recompressed graphene bromide sheets.

Example 6: Fluorination and Thermal Exfoliation of Carbon Fibers

A $CF_{0.68}$ sample obtained in EXAMPLE 5 was exposed at 250° C. and 1 atmosphere to vapors of 1,4-dibromo-2-butene ($BrH_2C$—$CH$=$CH$—$CH_2Br$) for 3 hours. It was found that two-thirds of the fluorine was lost from the graphite fluoride sample. It is speculated that 1,4-dibromo-2-butene actively reacts with graphite fluoride, removing fluorine from the graphite fluoride and forming bonds to carbon atoms in the graphite lattice. The resulting product (Sample 6A) is mixed halogenated graphite, likely a combination of graphite fluoride and graphite bromide. Some of powders were thermally exfoliated to obtain exfoliated carbon fibers, which were then mechanically sheared and roll-pressed to obtain a structure of oriented graphene fluoride sheets.

Example 7: Fluorination and Thermal Exfoliation of Graphite

Natural graphite flakes, a sieve size of 200 to 250 mesh, were heated in vacuum (under less than $10^{-2}$ mmHg) for about 2 hours to remove the residual moisture contained in the graphite. Fluorine gas was introduced into a reactor and the reaction was allowed to proceed at 375° C. for 120 hours while maintaining the fluorine pressure at 200 mmHg. This was based on the procedure suggested by Watanabe, et al. disclosed in U.S. Pat. No. 4,139,474. The powder product obtained was black in color. The fluorine content of the product was measured as follows: The product was burnt according to the oxygen flask combustion method and the fluorine was absorbed into water as hydrogen fluoride. The amount of fluorine was determined by employing a fluorine ion electrode. From the result, we obtained a GF (Sample 7A) having an empirical formula $(CF_{0.75})_n$. X-ray diffraction indicated a major (002) peak at 2θ=13.5 degrees, corresponding to an inter-planar spacing of 6.25 Å. Some of the graphite fluoride powder was thermally exfoliated to form graphite worms, which were then mechanically sheared to separate/isolate graphene sheets and then roll-pressed.

Sample 7B was obtained in a manner similar to that for Sample 7A, but at a reaction temperature of 640° C. for 5 hours. The chemical composition was determined to be (CF$_{0.93}$)$_n$. X-ray diffraction indicated a major (002) peak at 2θ=9.5 degrees, corresponding to an inter-planar spacing of 9.2 Å. Some of the graphite fluoride powder was thermally exfoliated to form graphite worms, which were then mechanically sheared and roll-pressed to produce a layer of recompressed, oriented graphene sheets.

Example 8: Preparation and Testing of Various Aluminum Cells

The graphene sheets prepared in Examples 1-7 were separately made into a cathode layer and incorporated into an aluminum secondary battery. Two types of Al anode were prepared. One was Al foil having a thickness from 16 μm to 300 μm. The other was Al thin coating deposited on surfaces of conductive nano-filaments (e.g. CNTs) or graphene sheets that form an integrated 3D network of electron-conducting pathways having pores and pore walls to accept Al or Al alloy. Either the Al foil itself or the integrated 3D nano-structure also serves as the anode current collector.

Cyclic voltammetry (CV) measurements were carried out using an Arbin electrochemical workstation at a typical scanning rate of 0.5-50 mV/s. In addition, the electrochemical performances of various cells were also evaluated by galvanostatic charge/discharge cycling at a current density from 50 mA/g to 10 A/g. For long-term cycling tests, multi-channel battery testers manufactured by LAND were used.

Figure 3:
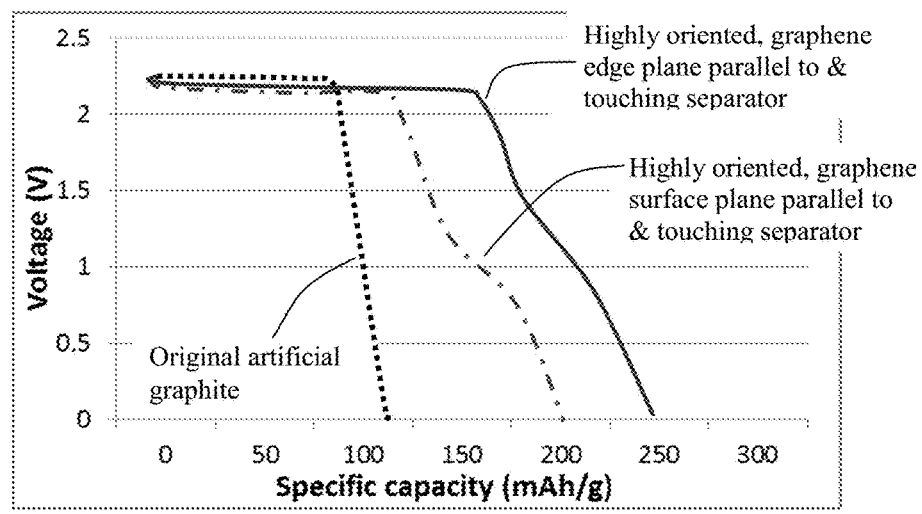
FIG. 3 The discharge curves of three Al foil anode-based cells: first one having a cathode layer of highly oriented graphene sheets (aligned perpendicular to the porous separator plane; graphene edge plane parallel to the separator plane) having a specific surface area (SSA)=23 m$^2$/g; second one having a cathode layer of highly oriented graphene sheets (aligned parallel to the porous separator plane; i.e. graphene surface plane parallel to the separator plane) having a specific surface area (SSA)=23 m$^2$/g), and third one having a cathode of original graphite particles (from which graphene sheets were produced).

FIG. 3 shows the discharge curves of three Al foil anode-based cells: first one having a cathode layer of highly oriented graphene sheets (aligned perpendicular to the porous separator plane; graphene edge plane parallel to the separator plane) having a specific surface area (SSA)=23 m$^2$/g; second one having a cathode layer of highly oriented graphene sheets (aligned parallel to the porous separator plane; graphene surface plane parallel to the separator plane) having a specific surface area (SSA)=23 m$^2$/g), and third one having cathode of original graphite particles (from which graphene sheets were produced). The electrolyte used was aluminum chloride mixed in 1-ethyl-3-methylimidazolium chloride (AlCl$_3$:EMIC molar ratio=3.5/1). These data indicate that the three battery cells all exhibit an initial plateau voltage, but the length of this plateau varied with different treatments. The cathode layer containing highly oriented graphene sheets (aligned perpendicular to the porous separator plane, having graphene edge plane parallel to the separator plane) exhibits the longest plateau; this mechanism quite likely corresponds to intercalation of Al$^{3+}$, AlCl$_4^-$, and/or Al$_2$Cl$_7^-$ ions into the nano pores or interstitial spaces between graphene sheets, further explained below:

In the discharge process, Al metal is oxidized and released from Al foil to form Al$^{3+}$ ions. Under the influence of the electric field, Al$^{3+}$ ions move to the cathode side. Then, Al$^{3+}$ ions and aluminum chloride coordination anions [Al$_a$Cl$_b$]$^-$ can simultaneously intercalate into the graphene layers, forming Al$_x$Cl$_y$. The intercalated Al$_x$Cl$_y$ and neighboring graphene layers interact with each other by van der Waals' forces. During the charge process, the electrochemical reactions are reversed.

In the ionic liquid-based electrolyte, the existing coordination ions are AlCl$_4^-$ or Al$_2$Cl$_7^-$, and thus the intercalated coordination ion [Al$_a$Cl$_b$]$^-$ might be AlCl$_4^-$ or Al$_2$Cl$_7^-$ or a mixture thereof. Based on the above assumption, the electrode reactions for both the anode and cathode may be described as follows:

In the charge process,

$$Al^{3+}+3e^-\rightarrow Al \text{(anode)} \tag{1}$$

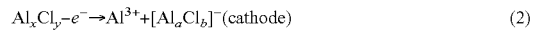

$$Al_xCl_y-e^-\rightarrow Al^{3+}+[Al_aCl_b]^- \text{(cathode)} \tag{2}$$

At the anode, during battery charging, Al$_2$Cl$_7$' ions can react with electrons to form AlCl$_4^-$ anions and Al. At the cathode, desorption of EMI$^+$ ions from graphite surfaces may also occur.

In the discharge process,

$$Al-3e^-\rightarrow Al^{3+} \text{(anode)} \tag{3}$$

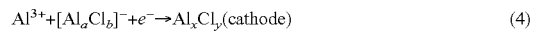

$$Al^{3+}+[Al_aCl_b]^-+e^-\rightarrow Al_xCl_y \text{(cathode)} \tag{4}$$

It appears that the strategy of heavily recompressing the graphene sheets can result in the inter-planar spaces between graphene planes to become smaller than 20 nm, preferably and typically smaller than 10 nm (having the inter-graphene pores <10 nm) enables massive amounts of the ions to "intercalate" into these confined spaces at a reasonably high voltage (2.2 vs. Al/Al$^{3+}$). Such an intercalation at a relatively high voltage over a long plateau range (large specific capacity, up to 150-350 mAh/g, depending on pore sizes) implies a high specific energy value (obtained by integrating the voltage curve over the specific capacity range) based on the cathode active material weight.

In addition to the intercalation of Al$^{3+}$, AlCl$_4^-$, and/or Al$_2$O$_7^-$ ions, there are graphene surface areas that are accessible to liquid electrolyte and the surfaces would become available for ion adsorption/desorption and/or surface redox reactions, leading to supercapacitor-type behaviors (electric double layer capacitance, EDLC, or redox pseudo-capacitance). This behavior is responsible for the slopping voltage curve after an initial plateau regime.

Figure 4:
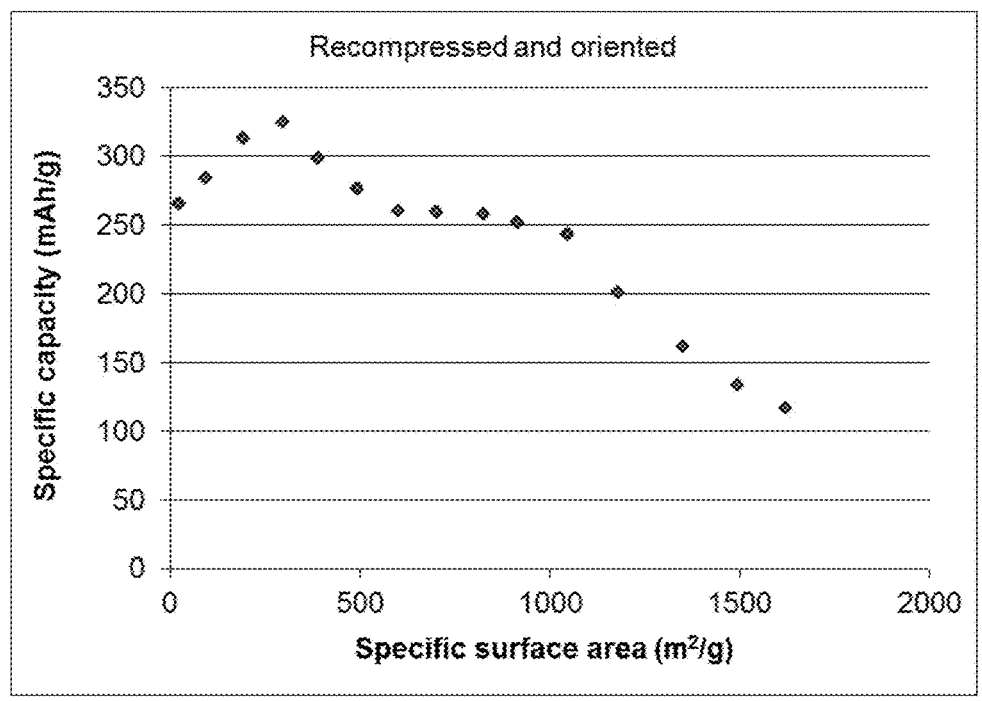
FIG. 4 The specific capacity values of a wide variety of lightly recompressed graphene sheets plotted as a function of the specific surface area.

We have observed that the plateau regime totally disappears when the graphene sheets are lightly recompressed to exhibit a SSA that exceeds approximately 800-900 m$^2$/g. FIG. 4 indicates that heavy recompression (as reflected by a low specific surface area) and graphene edge plane orientation lead to very high specific capacity of the cathode layer of recompressed graphene sheets having an edge plane aligned parallel to the separator and facing the separator. It seems that recompression tends to reduce the inter-graphene spaces down to 2-20 nm range, enabling an intercalation/de-intercalation type charge storage mechanism, and that the graphene sheet edges, if properly oriented, enable easier/faster and full entry of ions into inter-graphene spaces.

In summary, the charge or discharge of the invented cathode layer can involve several charge storage mechanisms. Not wishing to be bound by theory, but we believe that the main mechanisms at the cathode during battery charging are (1) desorption of EMI$^+$ ions from graphene surfaces, (2) de-intercalation by Al$^{3+}$ and AlCl$_4^-$ from the inter-planar spaces, and (3) desorption of AlCl$_4^-$ and Al$_2$O$_7^-$ ions from graphene sheet surfaces. At the anode, during battery charging, Al$_2$O$_7^-$ ions can react with electrons to form AlCl$_4^-$ anions and Al, wherein AlCl$_4^-$ anions move toward the cathode and Al deposits on Al foil or surface of the anode current collector. The Al$^{3+}$ ions released from the cathode may also react with electrons to form Al metal atoms that re-deposit onto Al foil surface or the surface of an anode current collector. Some EMI$^+$ ions may form electric double layers near the anode surfaces. The above processes are reversed when the battery is discharged. Different mechanisms can dominate in different regimes of the charge-discharge curves for the cathodes having different amounts of controlled interstitial spaces (2-20 nm) and inter-graphene pores (20 nm-100 nm) prepared by different procedures (different extents of recompression).

Figure 5:
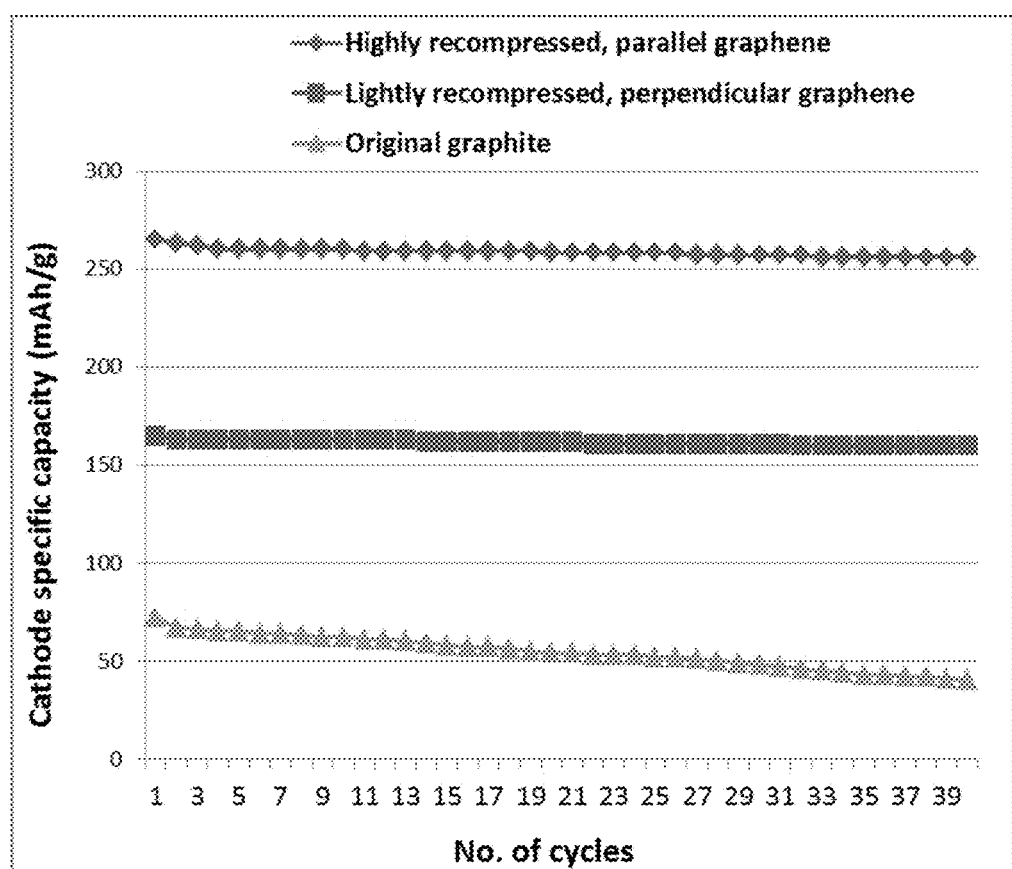
FIG. 5 The specific capacity values of three Al cells plotted as a function of charge/discharge cycles: a cell containing a cathode layer of heavily recompressed graphene sheets (having an edge plane being parallel to the separator and in ionic contact with the separator), a cell containing a cathode layer of heavily recompressed graphene sheets (having a graphene surface plane being parallel to the separator and in ionic contact with the separator), and a cell containing a cathode of original artificial graphite.

FIG. 5 shows the specific capacity values of three Al cells plotted as a function of charge/discharge cycles: a cell containing a cathode layer of heavily recompressed graphene sheets (having an edge plane being parallel to the separator and in ion-contact with the separator), a cell containing a cathode layer of heavily recompressed graphene sheets (having a graphene surface plane being parallel to the separator and in ionic contact with the separator), and a cell containing a cathode of original artificial graphite. These data demonstrate that, compared with the original graphite, graphene sheets heavily recompressed to produce an oriented structure having a graphene edge plane parallel to the separator, imparts a significantly higher charge storage capacity to an aluminum-ion battery. The procedure of forming graphene sheets, followed by recompression, enables more charges to be stored as compared to the original graphite-based cathode layer. The Al cells having highly aligned graphene sheets (graphene edge plane being parallel to the separator plane) exhibit the highest specific capacity and very stable cycling behaviors. The presently invented aluminum cells exhibit some supercapacitor-like behavior (having long cycle life) and some lithium ion battery-like behavior (moderate energy density).

Figure 7:
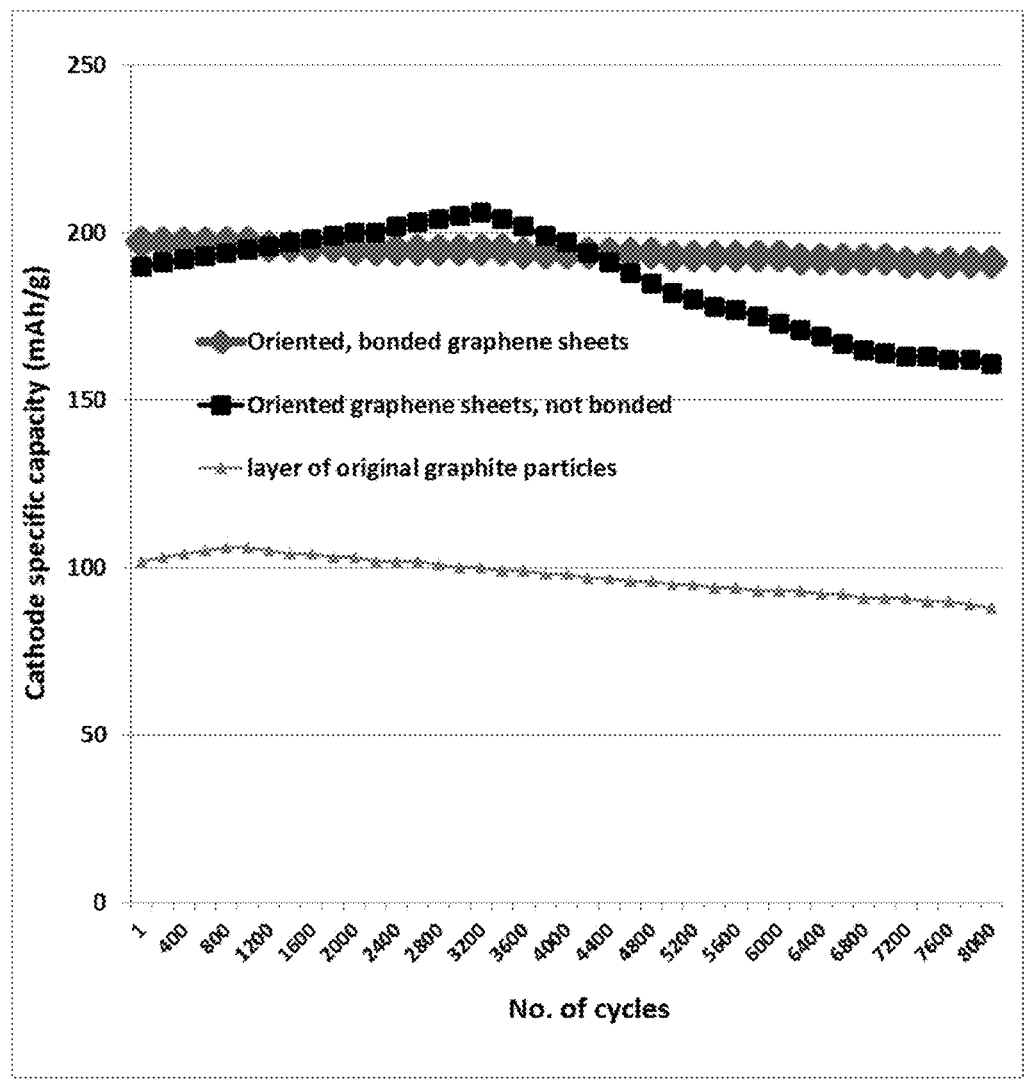
FIG. 7 The specific capacity values, plotted as a function of charge/discharge cycles, of three Al cells: first one containing a cathode of oriented graphene sheets (bonded by a binder resin), second containing a cathode of oriented graphene sheets (not bonded), and the third containing a layer of original graphite.

FIG. 7 shows the cycling responses of 3 aluminum-ion cells: first one containing a cathode of oriented graphene sheets (heavily recompressed and bonded by a binder resin), second containing a cathode of oriented graphene sheets (not bonded), and the third containing a layer of original graphite. This chart indicates that both the cell containing graphite particles and the cell containing un-bonded graphene sheets exhibit a gradual increase in specific capacity as the number of charge/discharge cycles increases. This could be due to the initially gradual increase in inter-graphene planar spaces to accommodate more ions. However, this electrochemical expansion and exfoliation of the graphite structure can lead to undesirably large separation between graphene planes or isolation of some graphene sheets, which no longer can contribute to charge storage. Hence, the charge storage capacity, after reaching some peak, begins to decrease rapidly due to the overall degradation of the structural integrity of the cathode layer. In contrast, the first cell contains a layer of oriented graphene sheets that were bonded together with a resin (3% by weight), wherein the binder resin was cured while the graphene sheets were in a compression state. Such a cathode appears to be capable of maintaining structural integrity for a large number of charge/discharge cycles.

Figure 6:
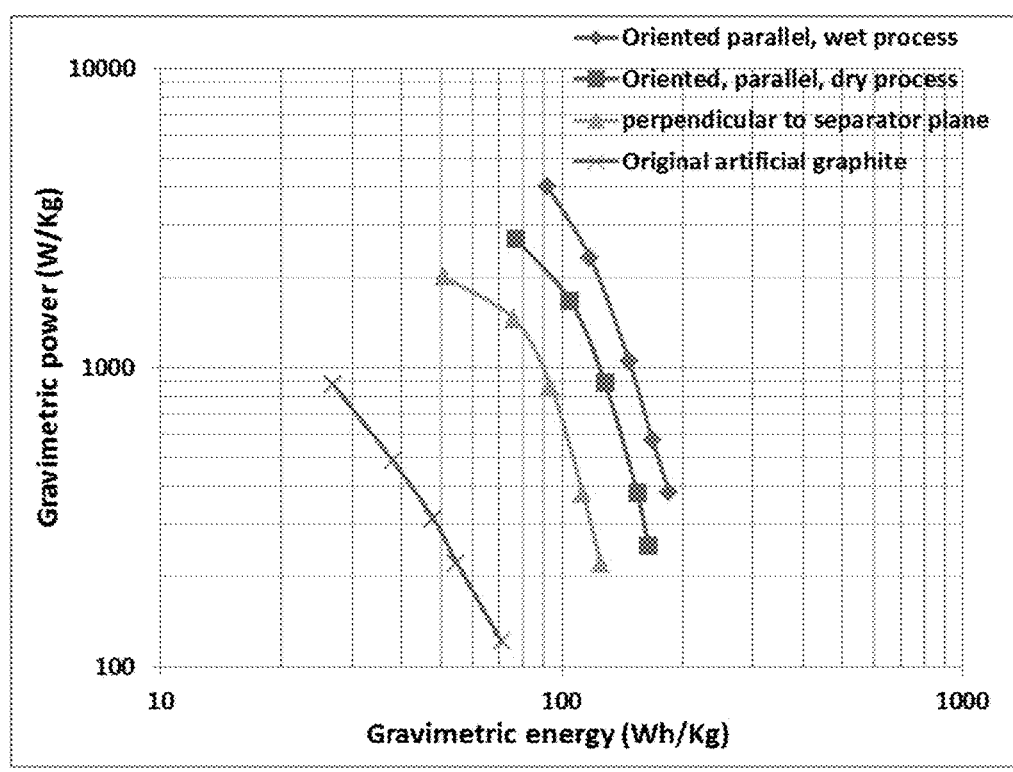
FIG. 6 The Ragone plots of four cells: a cell containing a cathode of original artificial graphite, a cell containing a cathode of oriented graphene sheets (graphene surface plane parallel to the separator and contacting therewith), a cell containing a cathode of oriented graphene sheets (graphene edge plane parallel to the separator and contacting therewith) prepared via dry compression, a cell containing a cathode of oriented graphene sheets (graphene edge plane parallel to the separator and contacting therewith) prepared via a wet-pressing process.

FIG. 6 shows the Ragone plots of four cells: a cell containing a cathode of original artificial graphite, a cell containing a cathode of oriented graphene sheets (graphene surface plane parallel to the separator and contacting therewith), a cell containing a cathode of oriented graphene sheets (graphene edge plane parallel to the separator and contacting therewith) prepared via dry compression; and a cell containing a cathode of oriented graphene sheets (graphene edge plane parallel to the separator and contacting therewith) prepared via a wet-pressing process. There are several unexpected results. The first is the observation that the Al cell featuring a cathode of artificial graphite that has been thermally exfoliated to form graphene sheets and heavily recompressed (properly oriented) using a wet-pressing process exhibits the highest cell-level specific energy, reaching as high as 185 Wh/kg, comparable to that of the lithium-ion battery and 20 times higher than that of a supercapacitor. The power density, 4,028 W/kg, is as high as that of the current supercapacitor and significantly higher than the power density (typically <500 W/kg) of the lithium-ion battery. The wet process having an intended liquid electrolyte as the liquid medium in the graphite worm suspension enables the liquid electrolyte to reach all places where electrolyte is needed.

The second is the notion that the Al cell featuring a cathode of artificial graphite that has been thermally exfoliated to form graphene sheets and heavily recompressed (properly oriented) using a dry-pressing process delivers both a high power density (2,687 W/kg) and high energy density of (164 Wh/kg) as well. If the graphene sheets in the cathode layer are oriented to become parallel to the separator layer (graphene surface plane in contact with the separator), both the energy density and power density are significantly reduced. These observations underscore the significance of properly orienting graphene sheets. As compared to the layer containing original graphite, all cathode layers containing aligned graphene sheets exhibit better energy density and power density.

We claim:

1. An aluminum secondary battery comprising an anode, a cathode, a porous separator electronically separating said anode and said cathode, and an electrolyte in ionic contact with said anode and said cathode to support reversible deposition and dissolution of aluminum at said anode, wherein said anode contains aluminum metal or an aluminum metal alloy as an anode active material and said cathode comprises a layer of aligned graphene sheets that are oriented in such a manner that said layer has a graphene edge plane in direct contact with said electrolyte and facing said separator.

2. The aluminum secondary battery of claim 1, wherein said graphene sheets are produced from a thermally exfoliated product selected from the group consisting of meso-phase pitch, meso-phase carbon, meso carbon micro-beads (MCMB), coke particles, expanded graphite flakes, artificial graphite particles, natural graphite particles, highly oriented pyrolytic graphite, soft carbon particles, hard carbon particles, multi-walled carbon nanotubes, carbon nano-fibers, carbon fibers, graphite nano-fibers, graphite fibers, carbonized polymer fibers, and combinations thereof.

3. The aluminum secondary battery of claim 1, wherein said graphene sheets are bonded together by a binder.

4. The aluminum secondary battery of claim 3, wherein said binder is chemically cured while the aligned graphene sheets are in a compression state.

5. The aluminum secondary battery of claim 1, wherein said layer of aligned graphene sheets has a physical density from 0.5 to 1.8 g/cm$^3$ and has meso-scaled pores having a pore size from 2 nm to 50 nm.

6. The aluminum secondary battery of claim 1, wherein said layer of aligned graphene sheets has a physical density from 1.1 to 1.8 g/cm$^3$ and has pores having a pore size from 2 nm to 5 nm.

7. The aluminum secondary battery of claim 1, wherein said layer of aligned graphene sheets has a specific surface area from 20 m$^2$/g to 1,500 m$^2$/g.

8. The aluminum secondary battery of claim 1, further comprising an anode current collector supporting said aluminum metal or aluminum metal alloy or further comprising a cathode current collector supporting said layer of recompressed exfoliated graphite or carbon material.

9. The aluminum secondary battery of claim 8, wherein said anode current collector contains an integrated nano-structure of electrically conductive nanometer-scaled filaments that are interconnected to form a porous network of electron-conducting paths comprising interconnected pores, wherein said filaments have a transverse dimension less than 500 nm.

10. The aluminum secondary battery of claim 9, wherein said filaments comprise an electrically conductive material selected from the group consisting of electro-spun nano fibers, vapor-grown carbon or graphite nano fibers, carbon or graphite whiskers, carbon nano-tubes, nano-scaled graphene platelets, metal nano wires, and combinations thereof.

11. The aluminum secondary battery of claim 1, wherein said electrolyte is selected from the group consisting of an aqueous electrolyte, organic electrolyte, molten salt electrolyte, ionic liquid electrolyte, and combinations thereof.

12. The aluminum secondary battery of claim 1, wherein said electrolyte contains $AlF_3$, $AlCl_3$, $AlBr_3$, $AlI_3$, $AlF_xCl_{(3-x)}$, $AlBr_xCl_{(3-x)}$, $AlI_xCl_{(3-x)}$, or a combination thereof, wherein x is from 0.01 to 2.0.

13. The aluminum secondary battery of claim 1, wherein said electrolyte contains an ionic liquid that contains an aluminum salt mixed with an organic chloride selected from the group consisting of n-butyl-pyridinium-chloride (BuPyCl), 1-methyl-3-ethylimidazolium-chloride (MEICl), 2-dimethyl-3-propylimidazolium-chloride, 1,4-dimethyl-1,2,4-triazolium chloride (DMTC), and mixtures thereof.

14. The aluminum secondary battery of claim 1, wherein the electrolyte also supports reversible intercalation and de-intercalation of ions at the cathode, wherein said ions include cations, anions, or both.

15. The aluminum secondary battery of claim 1, wherein said layer of aligned graphene sheets operates as a cathode current collector to collect electrons during a discharge of said aluminum secondary battery and wherein said battery contains no separate or additional cathode current collector.

16. The aluminum secondary battery of claim 1, wherein said layer of aligned graphene sheets further comprises an electrically conductive binder material which bonds said aligned graphene sheets together to form a cathode electrode layer.

17. The aluminum secondary battery of claim 16, wherein said electrically conductive binder material comprises a material selected from the group consisting of coal tar pitch, petroleum pitch, meso-phase pitch, a conducting polymer, a polymeric carbon, and derivatives thereof.

18. The aluminum secondary battery of claim 1, wherein said battery has an average discharge voltage no less than 1.5 volt and a cathode specific capacity greater than 100 mAh/g based on a total cathode active layer weight.

19. The aluminum secondary battery of claim 1, wherein said battery has an average discharge voltage no less than 1.5 volt and a cathode specific capacity greater than 200 mAh/g based on a total cathode active layer weight.

20. The aluminum secondary battery of claim 1, wherein said battery has an average discharge voltage no less than 2.0 volts and a cathode specific capacity greater than 100 mAh/g based on a total cathode active layer weight.

21. The aluminum secondary battery of claim 1, wherein said battery has an average discharge voltage no less than 2.0 volts and a cathode specific capacity greater than 200 mAh/g based on a total cathode active layer weight.

22. A method of manufacturing an aluminum secondary battery, comprising:
  (a) providing an anode containing aluminum metal or an aluminum alloy;
  (b) providing a cathode containing a layer of aligned graphene sheets; and
  (c) providing a porous separator electronically separating said anode and said cathode and an electrolyte capable of supporting reversible deposition and dissolution of aluminum at the anode and reversible adsorption/desorption and/or intercalation/de-intercalation of ions at the cathode;
  wherein said layer of aligned graphene sheets is oriented in such a manner that said layer has a graphene edge plane in direct contact with said electrolyte and facing or contacting said separator.

23. The method of claim 22, further including providing a porous network of electrically conductive nano-filaments to support said aluminum metal or aluminum alloy at the anode.

24. The method of claim 22, wherein said electrolyte contains an aqueous electrolyte, an organic electrolyte, a molten salt electrolyte, or an ionic liquid.

25. The method of claim 22, wherein providing a cathode contains subjecting a carbon or graphite material to an expansion treatment selected from an oxidation, fluorination, bromination, chlorination, nitrogenation, intercalation, combined oxidation-intercalation, combined fluorination-intercalation, combined bromination-intercalation, combined chlorination-intercalation, or combined nitrogenation-intercalation, followed by thermal exfoliation at a temperature from 100° C. to 2,500° C. and mechanical shearing.

26. The method of claim 22, wherein said procedure of providing the cathode includes compressing multiple graphene sheets using a wet compression or dry compression to align said graphene sheets.

27. The method of claim 22, wherein said procedure of providing the cathode includes compressing multiple graphene sheets using a wet compression to align said graphene sheets, wherein said wet compression includes compressing or pressing a suspension of said multiple graphene sheets dispersed in a liquid electrolyte for an aluminum cell.

\* \* \* \* \*